(12) United States Patent
Tokito

(10) Patent No.: US 11,945,375 B2
(45) Date of Patent: Apr. 2, 2024

(54) ONBOARD CAMERA HOLDING METHOD, ONBOARD CAMERA, BRACKET

(71) Applicant: Sony Semiconductor Solutions Corporation, Kanagawa (JP)

(72) Inventor: Toshihiro Tokito, Kanagawa (JP)

(73) Assignee: Sony Semiconductor Solutions Corporation, Kanagawa (JP)

(*) Notice: Subject to any disclaimer, the term of this patent is extended or adjusted under 35 U.S.C. 154(b) by 550 days.

(21) Appl. No.: 17/262,179

(22) PCT Filed: Jul. 17, 2019

(86) PCT No.: PCT/JP2019/028012
§ 371 (c)(1),
(2) Date: Jan. 21, 2021

(87) PCT Pub. No.: WO2020/026801
PCT Pub. Date: Feb. 6, 2020

(65) Prior Publication Data
US 2021/0284082 A1    Sep. 16, 2021

(30) Foreign Application Priority Data
Jul. 31, 2018    (JP) .................................. 2018-143618

(51) Int. Cl.
*B60R 11/04*    (2006.01)
*G03B 17/56*    (2021.01)
(Continued)

(52) U.S. Cl.
CPC ............ *B60R 11/04* (2013.01); *G03B 17/561* (2013.01); *H04N 23/51* (2023.01); *H04N 23/54* (2023.01); *H04N 23/60* (2023.01)

(58) Field of Classification Search
None
See application file for complete search history.

(56) References Cited

U.S. PATENT DOCUMENTS 10,471,906 B2 * 11/2019 Kasai ..................... H04N 23/51
10,800,343 B2 * 10/2020 Kasai ..................... B60R 11/02
(Continued)

FOREIGN PATENT DOCUMENTS

CN    1822642 A    8/2006
CN    106168729 A    11/2016
(Continued)

OTHER PUBLICATIONS

International Search Report and English translation thereof dated Sep. 3, 2019 in connection with International Application No. PCT/JP2019/028012.
(Continued)

*Primary Examiner* — Rodney E Fuller
(74) *Attorney, Agent, or Firm* — Wolf, Greenfield & Sacks, P.C.

(57) ABSTRACT

Disclosed are an onboard camera holding method, an onboard camera, and a bracket that enable the onboard camera to be positionally aligned with precision. The holding method according to an aspect of the present technology is a method of holding the onboard camera that includes protruding portions having cylindrical faces respectively formed on a front face and left and right opposite side faces of a housing, by pressing the cylindrical faces of the respective protruding portions of the onboard camera against notches at insertion holes formed at positions of a bracket corresponding to positions of the respective protruding portions by use of forces applied by pressurizing members provided to the bracket, the pressurizing members applying the forces to predetermined positions of the housing. The present technology can be applied to the bracket of the onboard camera.

17 Claims, 32 Drawing Sheets

(51) Int. Cl.
*H04N 23/51* (2023.01)
*H04N 23/54* (2023.01)
*H04N 23/60* (2023.01)

(56) References Cited

U.S. PATENT DOCUMENTS

| | | |
|---|---|---|
| 10,921,166 B2* | 2/2021 | Matori ............ G03B 17/561 |
| 2001/0022230 A1 | 9/2001 | Kaplo |
| 2006/0181633 A1 | 8/2006 | Seo |
| 2008/0014797 A1 | 1/2008 | Yang |
| 2008/0254652 A1 | 10/2008 | Ma |
| 2010/0097519 A1 | 4/2010 | Byrne et al. |
| 2010/0327138 A1 | 12/2010 | Yamada et al. |
| 2011/0025850 A1 | 2/2011 | Maekawa et al. |
| 2015/0327377 A1 | 11/2015 | Mano et al. |
| 2015/0327398 A1 | 11/2015 | Achenbach et al. |
| 2016/0191863 A1 | 6/2016 | Minikey, Jr. et al. |
| 2016/0257265 A1 | 9/2016 | Kageyama et al. |
| 2016/0344912 A1 | 11/2016 | Baik et al. |
| 2017/0217382 A1 | 8/2017 | Gunes |
| 2017/0240120 A1 | 8/2017 | Krug et al. |
| 2017/0274837 A1 | 9/2017 | Kasai et al. |
| 2018/0239223 A1 | 8/2018 | Blake, III |
| 2019/0028620 A1 | 1/2019 | Park |
| 2019/0174623 A1 | 6/2019 | Owaki |
| 2019/0193649 A1 | 6/2019 | Kataishi et al. |
| 2021/0127532 A1 | 4/2021 | Persson et al. |
| 2021/0297564 A1 | 9/2021 | Tokito |

FOREIGN PATENT DOCUMENTS

| | | |
|---|---|---|
| CN | 108028459 A | 5/2018 |
| DE | 10 2013 005 801 A1 | 10/2014 |
| EP | 3512316 A1 | 7/2019 |
| EP | 3518033 A1 | 7/2019 |
| JP | H08-097584 A | 4/1996 |
| JP | 2006-229922 A | 8/2006 |
| JP | 2013-004551 A | 1/2013 |
| JP | 2014-011565 A | 1/2014 |
| JP | 2015-216444 A | 12/2015 |
| JP | 2016-159875 A | 9/2016 |
| JP | 2017-523088 A | 8/2017 |
| JP | 2017-171168 A | 9/2017 |
| JP | 2018-006861 A | 1/2018 |
| JP | 2018-022953 A | 2/2018 |
| JP | 2018-509021 A | 3/2018 |
| KR | 10-2008-0088718 A | 10/2008 |
| WO | WO 2016/010970 A1 | 1/2016 |
| WO | WO 2016/109790 A1 | 7/2016 |
| WO | WO 2017/132088 A1 | 8/2017 |
| WO | WO 2018/047491 A1 | 3/2018 |
| WO | WO 2018/055905 A1 | 3/2018 |
| WO | WO 2018/100646 A1 | 6/2018 |

OTHER PUBLICATIONS

International Search Report and English translation thereof dated Oct. 8, 2019 in connection with International Application No. PCT/JP2019/028011.

International Written Opinion and English translation thereof dated Oct. 8, 2019 in connection with International Application No. PCT/JP2019/028011.

International Preliminary Report on Patentability and English translation thereof dated Feb. 11, 2021 in connection with International Application No. PCT/JP2019/028011.

International Written Opinion and English translation thereof dated Sep. 3, 2019 in connection with International Application No. PCT/JP2019/028012.

International Preliminary Report on Patentability and English translation thereof dated Feb. 11, 2021 in connection with International Application No. PCT/JP2019/028012.

* cited by examiner

FIG. 32
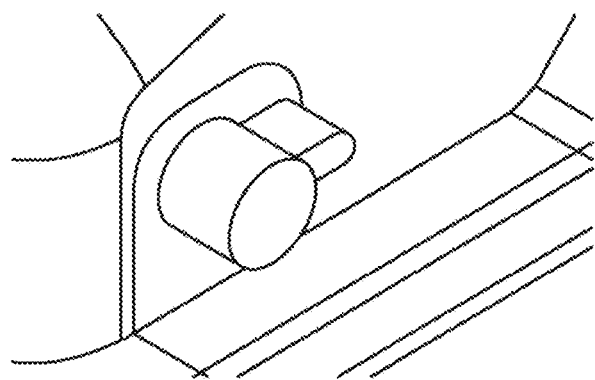
A
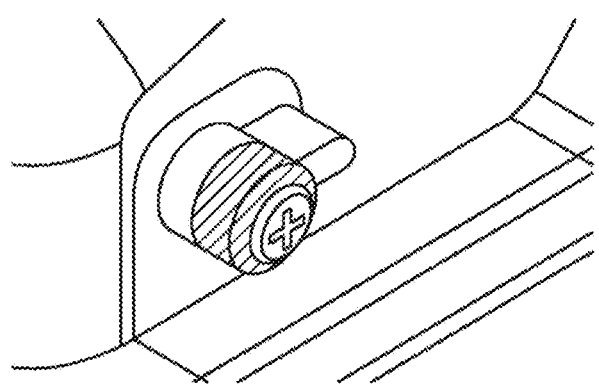
B

ONBOARD CAMERA HOLDING METHOD, ONBOARD CAMERA, BRACKET

CROSS-REFERENCE TO RELATED APPLICATIONS

This application claims the benefit under 35 U.S.C. § 371 as a U.S. National Stage Entry of International Application No. PCT/JP2019/028012, filed in the Japanese Patent Office as a Receiving Office on Jul. 17, 2019, which claims priority to Japanese Patent Application Number JP2018-143618, filed in the Japanese Patent Office on Jul. 31, 2018, each of which is hereby incorporated by reference in its entirety.

TECHNICAL FIELD

The present technology relates to an onboard camera holding method, an onboard camera, and a bracket, and particularly to an onboard camera holding method, an onboard camera, and a bracket that enable the onboard camera to be positionally aligned with precision.

BACKGROUND ART

In recent years, there are more and more automobiles in which a camera is mounted. For example, images captured by the camera are used to detect objects such as white lines on roads, traffic lights, road signs, oncoming cars, and pedestrians and to provide traveling assistance and visibility assistance on the basis of detection results.

The camera for capturing images of front conditions during traveling is fixed by use of a bracket mounted, for example, near a rearview mirror.

CITATION LIST

Patent Document

Patent Document 1: Japanese Patent Application Laid-Open No. 2018-022953

SUMMARY OF THE INVENTION

Problem to be Solved by the Invention

The camera is mounted to the bracket by, for example, fitting lug portions respectively provided to left and right opposite ends of a forward portion and left and right opposite ends of a rear portion of the bracket into notch portions formed at corresponding positions of a housing of the camera.

In a case where the camera is mounted using the mechanisms at the four positions in this manner, it is difficult to positionally align an optical axis of a lens with precision. For example, in a case where there is even a single clearance between the lug portion and the notch portion, it produces backlash of the entire housing of the camera.

The present technology has been made in view of such circumstances and enables an onboard camera to be positionally aligned with precision.

Solutions to Problem

A holding method according to a first aspect of the present technology is a method of holding an onboard camera that includes protruding portions having cylindrical faces respectively formed on a front face and left and right opposite side faces of a housing, by pressing the cylindrical faces of the respective protruding portions of the onboard camera against notches at insertion holes formed at positions of a bracket corresponding to positions of the respective protruding portions by use of forces applied by pressurizing members provided to the bracket, the pressurizing members applying the forces to predetermined positions of the housing.

An onboard camera according to a second aspect of the present technology includes protruding portions having cylindrical faces and respectively formed on a front face and left and right opposite side faces of a housing and notch portions on the housing and formed at such positions that pressurizing members of a bracket come in contact with the notch portions, the bracket having insertion holes for the protruding portions at positions corresponding to positions of the protruding portions.

A bracket according to a third aspect of the present technology includes insertion holes for protruding portions respectively formed on a front face and left and right opposite side faces of a housing of an onboard camera, the insertion holes formed at positions corresponding to positions of the protruding portions and pressurizing members that press cylindrical faces of the respective protruding portions of the onboard camera against notches formed at the respective insertion holes by applying forces to predetermined positions of the housing.

In the present technology, the onboard camera, on the front face and the left and right opposite side faces of the housing of which the protruding portions having the cylindrical faces are respectively formed, is held by pressing of the cylindrical faces of the respective protruding portions of the onboard camera against the notches at the insertion holes formed at the positions of the bracket corresponding to the positions of the respective protruding portions by use of the forces applied by the pressurizing members provided to the bracket, the pressurizing members applying the forces to the predetermined positions of the housing.

Effects of the Invention

According to the present technology, it is possible to positionally align the onboard camera with precision.

Note that the effect described herein is not necessarily a sole effect and any of effects described herein may be exerted.

BRIEF DESCRIPTION OF DRAWINGS

FIG. 32 contains perspective views of the states of the protruding portions including the one mounted with a part including a different material.

MODE FOR CARRYING OUT THE INVENTION

Figure 1:
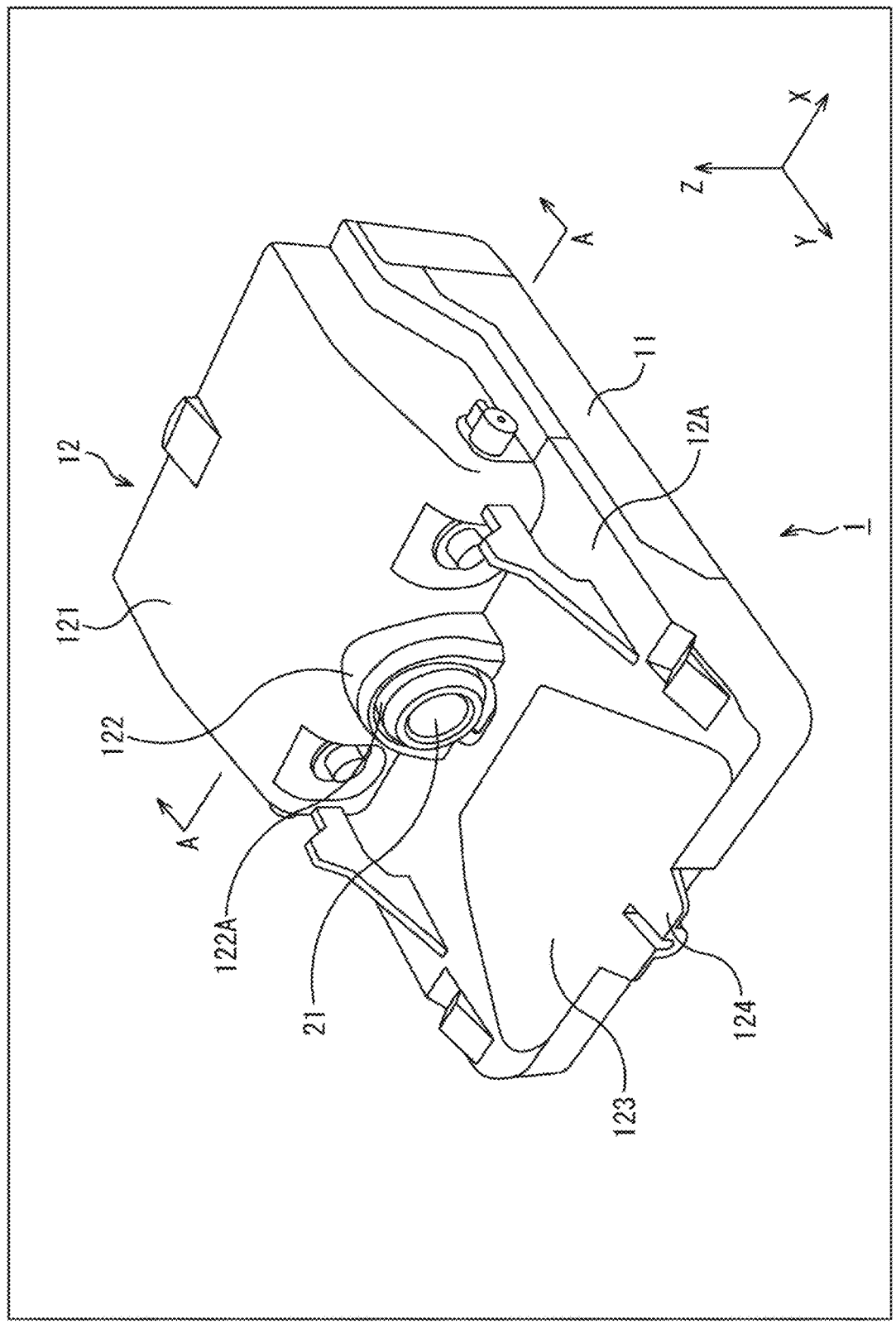
FIG. 1 is a perspective view of an exemplary outward appearance of a front camera according to an embodiment of the present technology.

A mode for carrying out the present technology will be described below. The description will be given in the following order.

1. Outward appearance of front camera
2. Configurations of respective faces of front camera
3. Way to mount front camera
4. Configurations of respective faces of bracket
5. Front camera holding mechanisms
6. Modifications <Outward Appearance of Front Camera>

FIG. 1 is a perspective view of an exemplary outward appearance of a front camera according to an embodiment of the present technology.

The front camera 1 has a housing having a substantially flattened wedge shape sloping down forward in a side view. In FIG. 1, a normal direction along a Y-axis corresponds to a forward direction with respect to the front camera 1.

The front camera 1 is formed by covering a bottom plate 11, forming a bottom face, and the like with a front case 12. For example, the bottom plate 11 is formed by processing a thin plate member including metal such as aluminum and the front case 12 includes resin having high heat resistance.

In a rear of a top face portion 12A of the front case 12, a housing portion 121 is formed to bulge while leaving narrow marginal portions on left and right sides (in an X-axis direction). Respective parts are housed in a space inside the housing portion 121. A forward portion of a top face of the housing portion 121 forms a slope gently sloping down forward.

A semicylindrical arch portion 122 protruding forward is formed at a substantially central position of a front face side of the housing portion 121, and a substantially circular hole portion 122A is formed on a front face side of the arch portion 122. A lens module is provided in the housing portion 121 such that a lens 21 of the lens module is exposed from the hole portion 122A.

A trapezoidal recessed portion 123 widening in the X-axis direction as it extends forward (in the normal direction along the Y-axis) and recessed shallowly to have a slope gently sloping down forward is formed on a forward side of the lens 21 provided to face the front. The recessed portion 123 is formed so as not to obstruct an angle of view of the front camera 1.

At a center of a tip end of the front camera 1, a tip end protruding portion 124 forming a face continuous with the slope of the recessed portion 123 is formed. The tip end protruding portion 124 is a small chip member having a substantially trapezoidal shape with round corners in a plan view. Details of a shape of the front camera 1 will be described later.

The front camera 1 having such a configuration in outward appearance is an onboard camera mounted to a vehicle such as an automobile.

Figure 2:
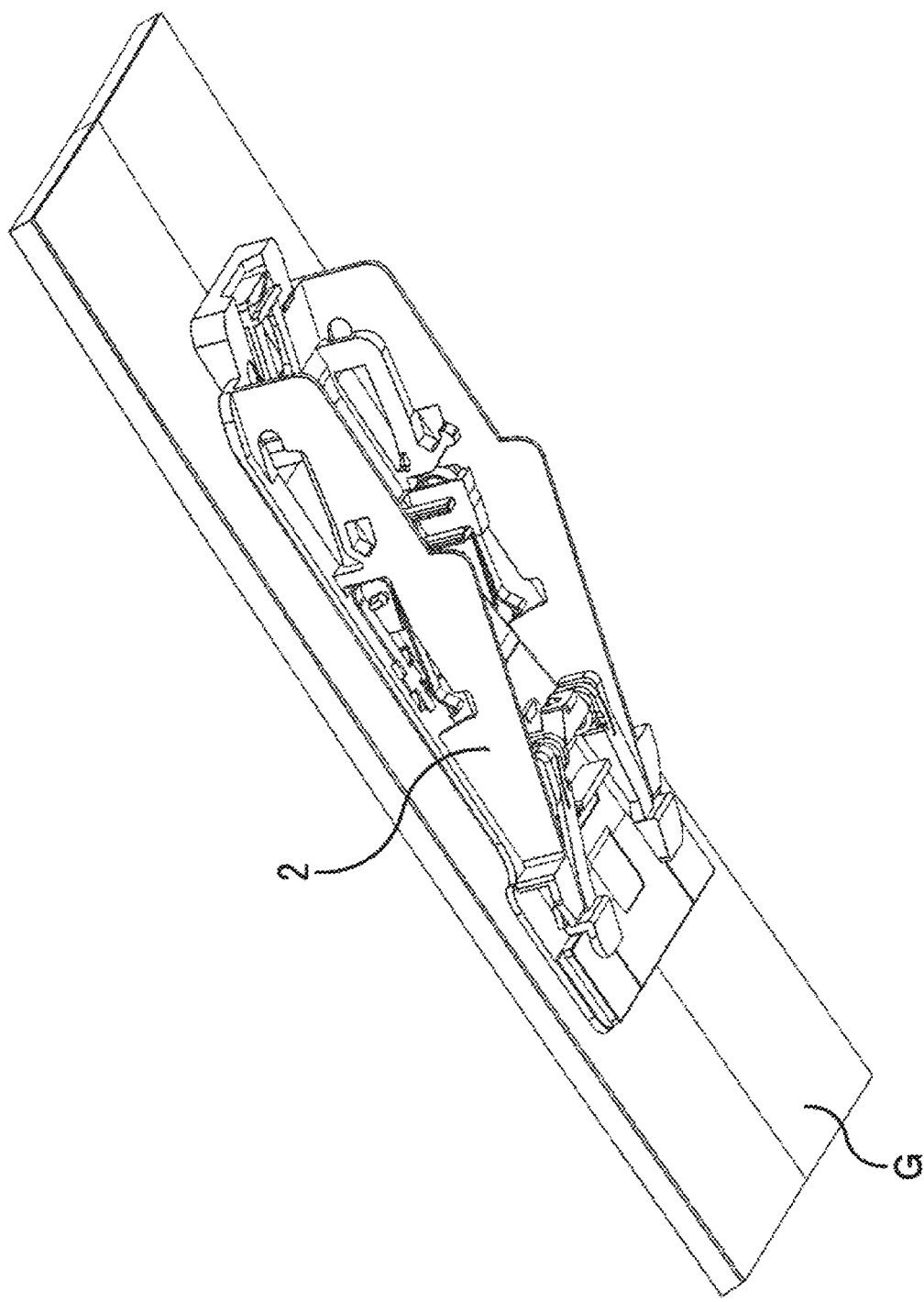
FIG. 2 is a view showing an example of a way to mount the front camera.

FIG. 2 is a view showing an example of a way to mount the front camera 1. Reference sign G designates a windshield of the car.

As shown in FIG. 2, a bracket 2 serving as a receiving-side mounting part to which the front camera 1 is mounted is mounted to an inner side (a side of a vehicle interior) of the windshield G. The bracket 2 is mounted, for example, near a rearview mirror.

In FIG. 2, a left side of the windshield G is an outer side of the vehicle and a right side is an inner side of the vehicle. Although only a band-shaped portion having a predetermined width is shown as a portion of the windshield in the example in FIG. 2, the whole windshield G is actually formed by a broader glass member.

Figure 3:
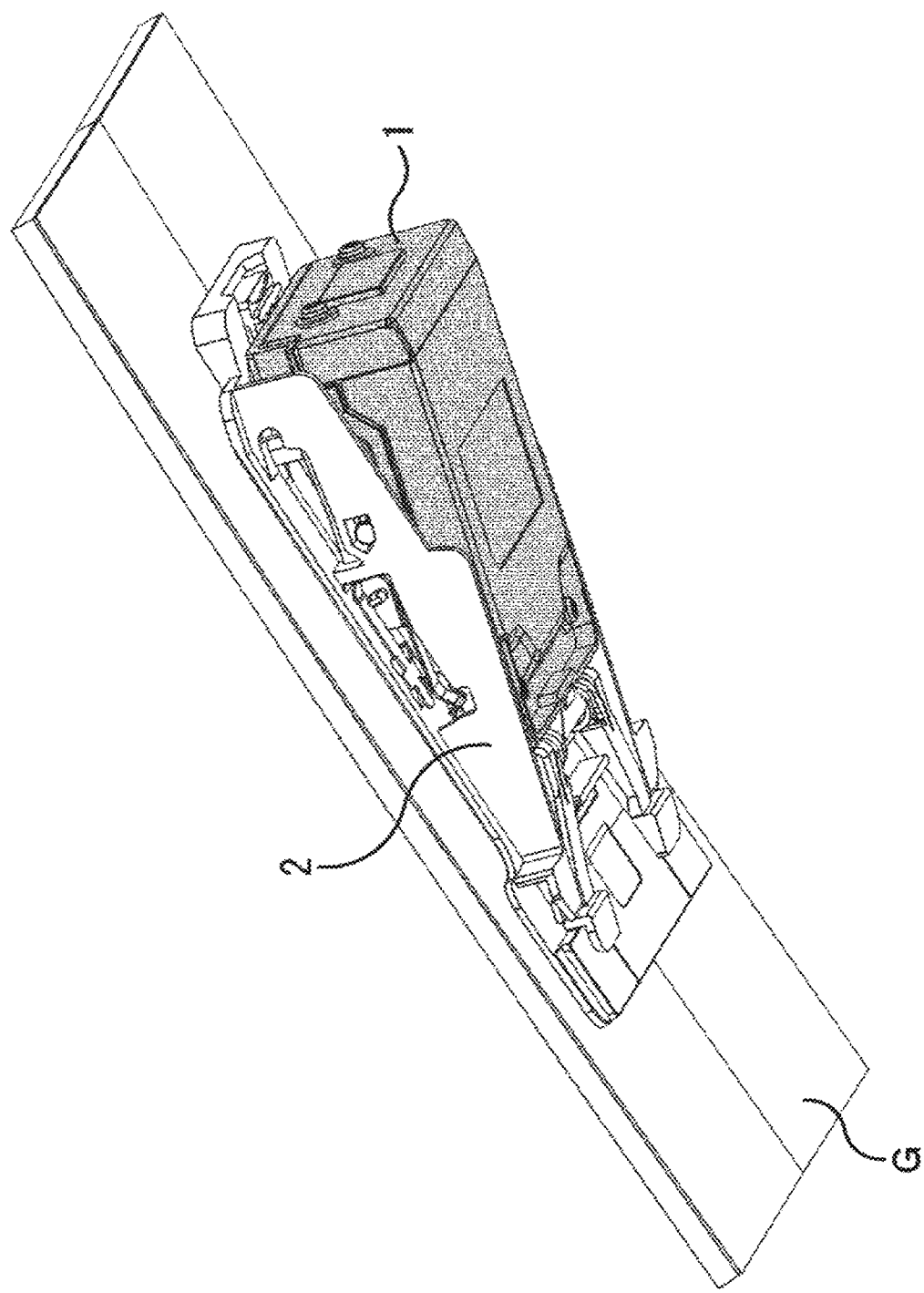
FIG. 3 is a view of a state where the front camera is mounted to a bracket.

The front camera 1 is mounted to the bracket 2 such that the lens 21 faces forward with respect to the vehicle, as shown as a colored portion in FIG. 3. In other words, the front camera 1 is mounted in such a manner as to be able to take an image of an outside and forward view of the vehicle through the windshield G. The front camera 1 mounted to the bracket 2 is connected to a control unit mounted to the vehicle, for example, by wire.

The front camera 1 has functions of analyzing the projected image captured during traveling of the vehicle and recognizing various kinds of objects including roads, pedestrians, obstacles, and the like. The front camera 1 has not only the image capturing function but also such an image analysis function. In the front camera 1, a Central Processing Unit (CPU) for executing a predetermined program to carry out the image analysis and the like, a memory, and the like are provided.

On the basis of a result of the recognition by the front camera 1, various kinds of processing such as traveling control and provision of information to a driver are performed by the control unit mounted to the vehicle.

<Configurations of Respective Faces of Front Camera>

Configurations of respective faces of the front camera 1 will be described.

Figure 4:
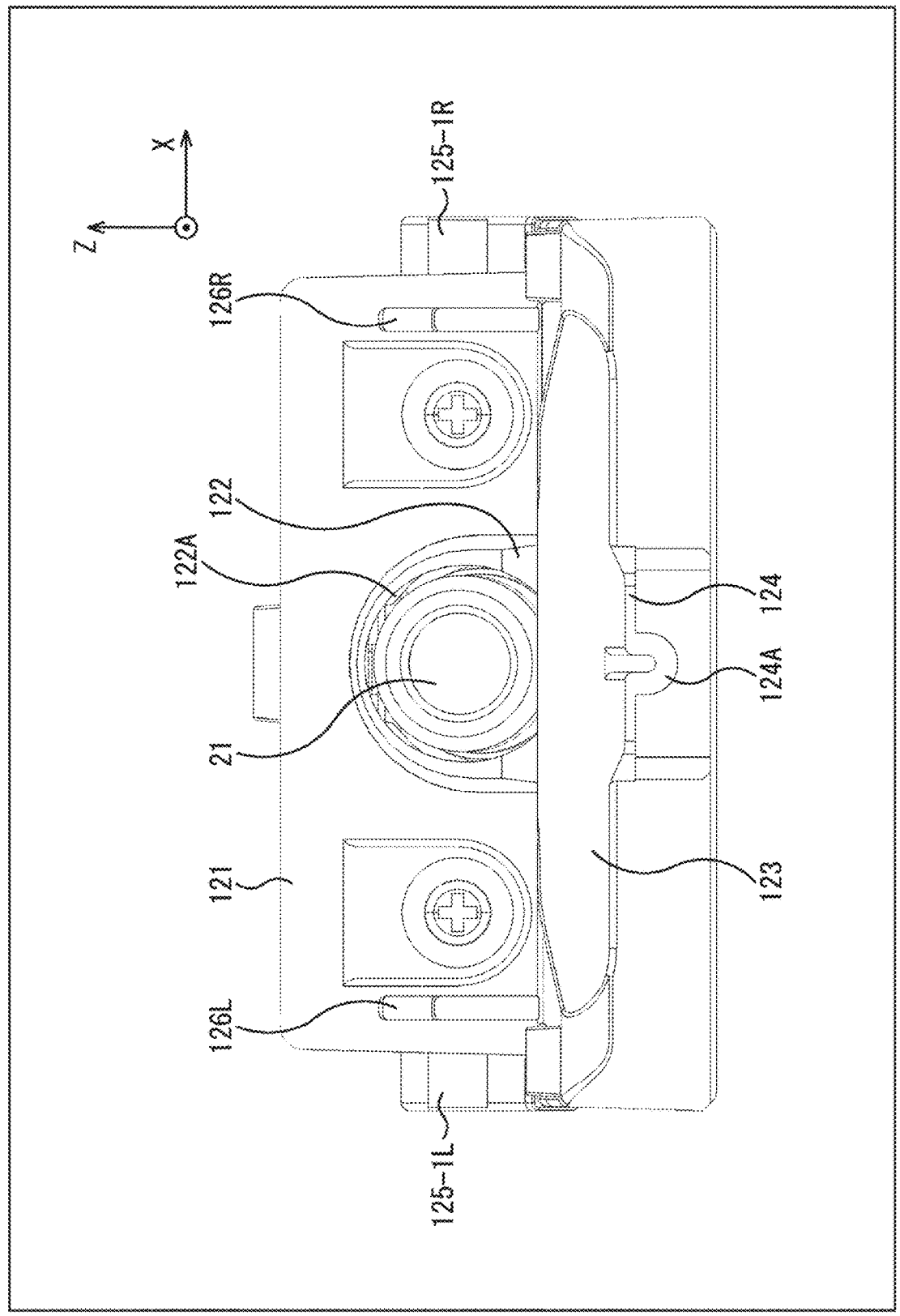
FIG. 4 is a front view of the front camera.
Figure 5:
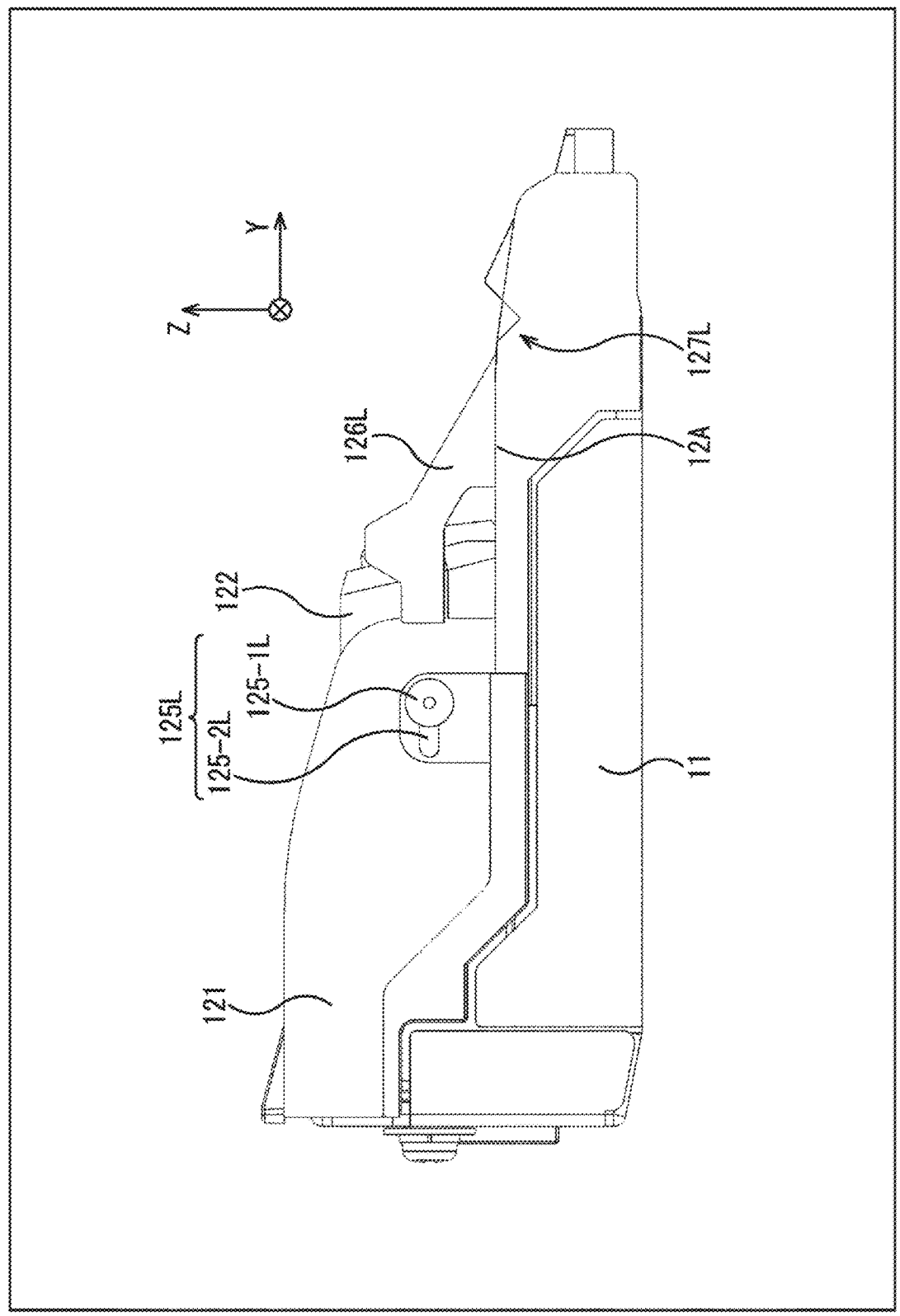
FIG. 5 is a left side view of the front camera.
Figure 6:
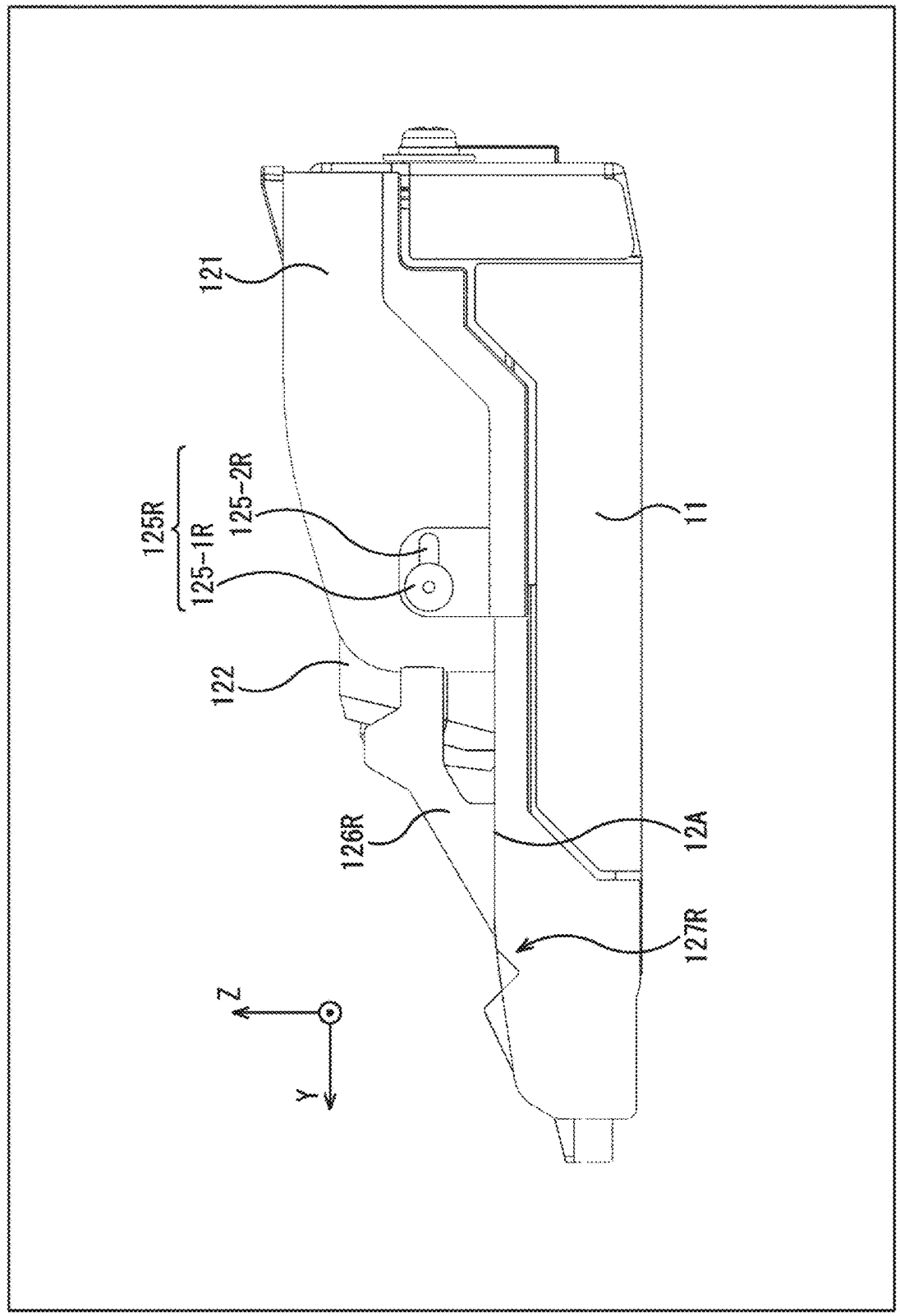
FIG. 6 is a right side view of the front camera.

FIG. 4 is a front view of the front camera 1. FIG. 5 is a left side view of the front camera 1 and FIG. 6 is a right side view of the front camera 1. Descriptions overlapping what have been described with reference to FIG. 1 will be omitted properly.

As shown in FIG. 4, a semicylindrical protruding portion 124A having a substantially U shape in a front view is formed on a bottom face side of the tip end protruding portion 124. A narrow groove is formed in a top face of the tip end protruding portion 124. In FIG. 4, a normal direction along the Z-axis is a direction in which the top face is oriented.

At a position of a left side face (a side face on a viewer's left hand side in the front view) of the housing portion 121 closer to a forward side, a cylindrical protruding portion 125L is formed. As shown in FIG. 5, the protruding portion 125L is formed in a rear of a cylindrical protruding portion 125-1L by integrally forming a flattened laterally-long protruding portion 125-2L. The protruding portion 125-1L is slightly higher than the protruding portion 125-2L in the X-axis direction.

On the other hand, at a position of a right side face (a side face on a viewer's right hand side in the front view) of the housing portion 121 closer to the forward side, a cylindrical protruding portion 125R is formed. As shown in FIG. 6, the protruding portion 125R is formed in a rea of a cylindrical protruding portion 125-1R by integrally forming a flattened laterally-long protruding portion 125-2R in a right side view. The protruding portion 125-1R is slightly higher than the protruding portion 125-2R in the X-axis direction.

The front camera 1 is positionally aligned by inserting the tip end protruding portion 124 formed on a front face of the front camera 1 and the protruding portions 125L and 125R formed on the left and right opposite side faces into hole portions formed in corresponding positions of the bracket 2.

As shown in FIG. 5, on a front face side of the housing portion 121, a connecting portion 126L is formed between a front face of the housing portion 121 and the top face portion 12A. In a forward part of the connecting portion 126L, a substantially V-shaped notch portion 127L is formed.

On the other hand, as shown in FIG. 6, on the front face side of the housing portion 121, a connecting portion 126R is formed between the front face of the housing portion 121 and the top face portion 12A. In a forward part of the connecting portion 126R, a substantially V-shaped notch portion 127R is formed.

The notch portion 127L and the notch portion 127R are also used in the mounting to the bracket 2.

Figure 7:
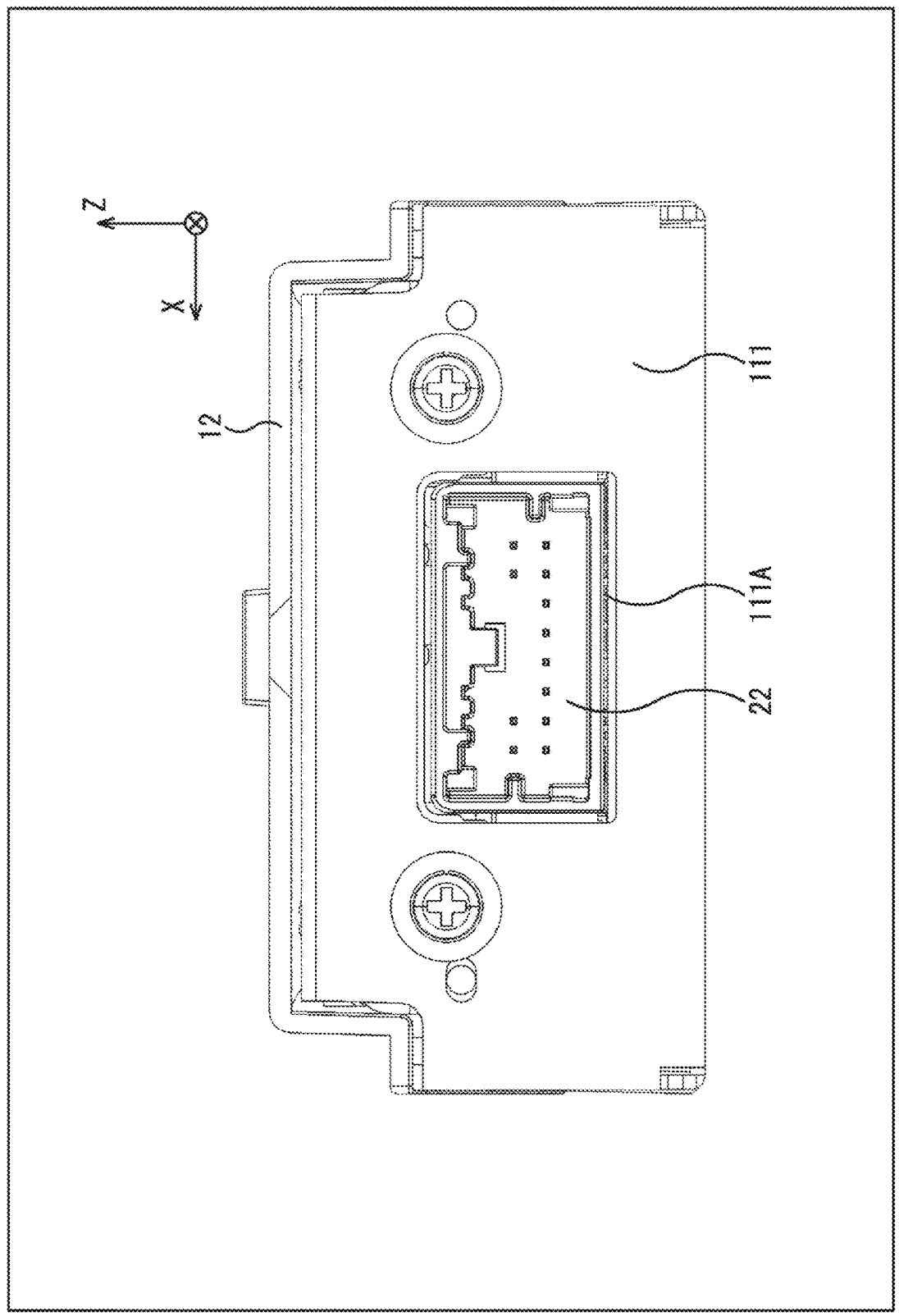
FIG. 7 is a back view of the front camera.

FIG. 7 is a back view of the front camera 1.

A back face of the front camera 1 is formed by being covered with a back face portion 111 of the bottom plate 11. A laterally long rectangular hole portion 111A is formed substantially at a center of the back face portion 111 that is in a laterally long (long in the X-axis direction) bilaterally-symmetric victory stand shape, and a terminal 22 is formed in the hole portion 111A. A cable that connects the front camera 1 and the control unit is connected to the terminal 22.

Figure 8:
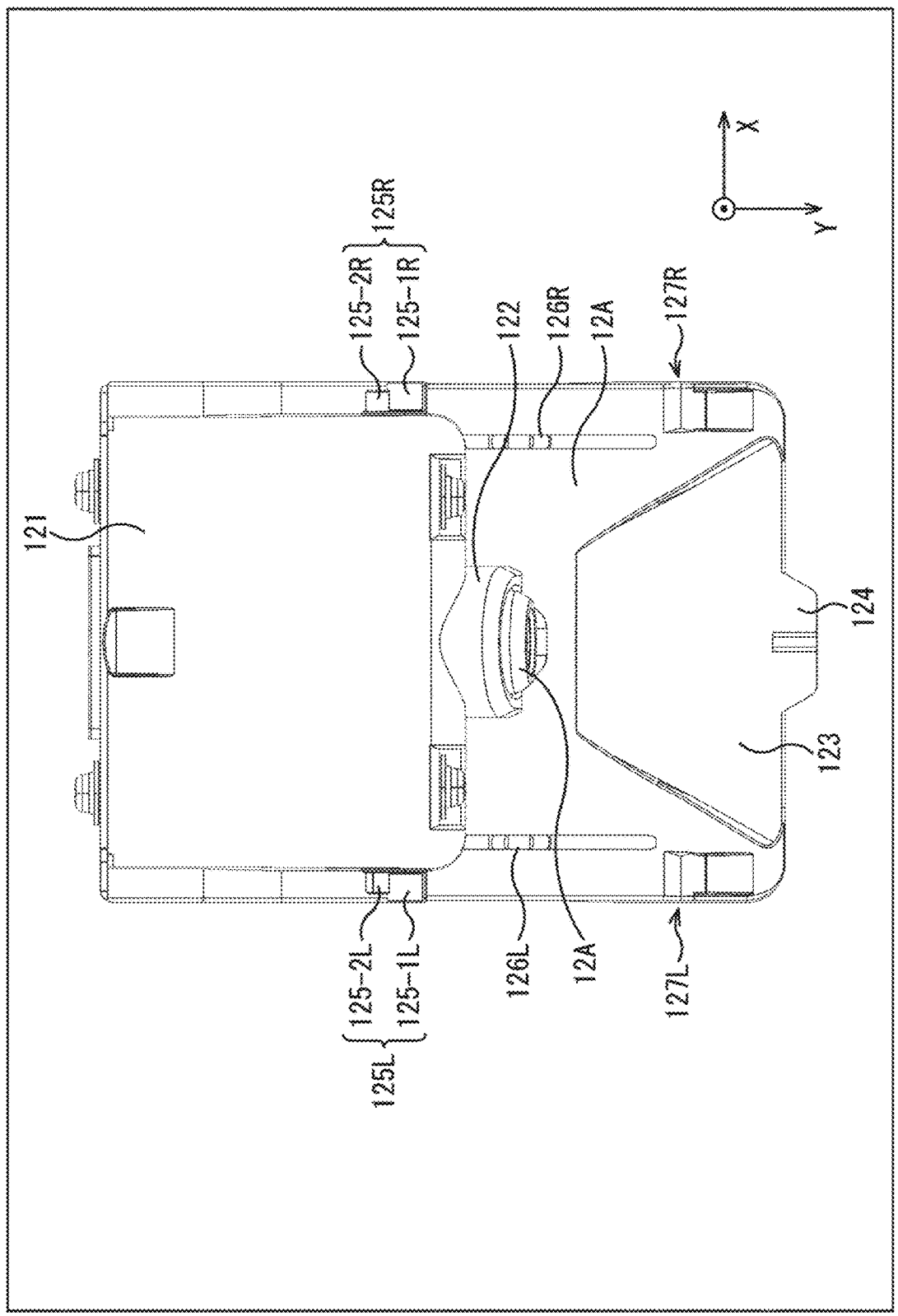
FIG. 8 is a plan view of the front camera.
Figure 9:
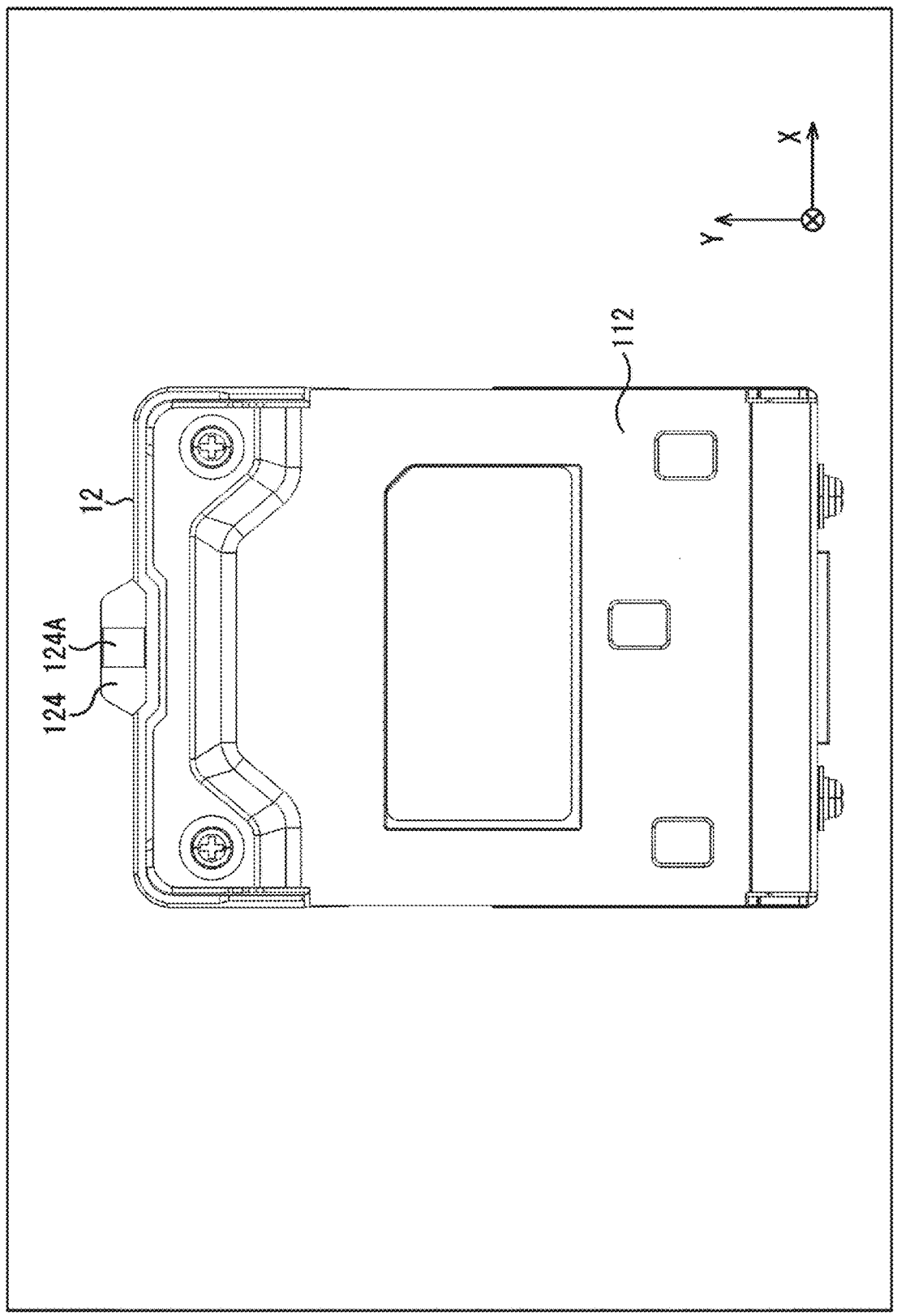
FIG. 9 is a bottom view of the front camera.

A plan configuration of the front camera 1 is shown in FIG. 8 and a bottom configuration of the front camera 1 is shown in FIG. 9.

As shown in FIG. 8, the housing portion 121 is formed in an almost entire area behind a substantially central position of the front camera 1 while leaving narrow marginal portions on left and right sides.

Furthermore, the protruding portion 125L and the protruding portion 125R are formed at substantially central positions in a front-rear direction (a Y-axis direction) of the front camera 1. The notch portion 127L is formed in a forward left end of the front camera 1 and the notch portion 127R is formed in a forward right end of the front camera 1.

As shown in FIG. 9, the bottom face of the front camera 1 is formed by being covered with a bottom face portion 112 of the bottom plate 11. The protruding portion 124A having a cylindrical face is formed on the bottom face side of the tip end protruding portion 124 provided at a center of the front face of the front camera 1.

<Way to Mount Front Camera>

Figure 10:
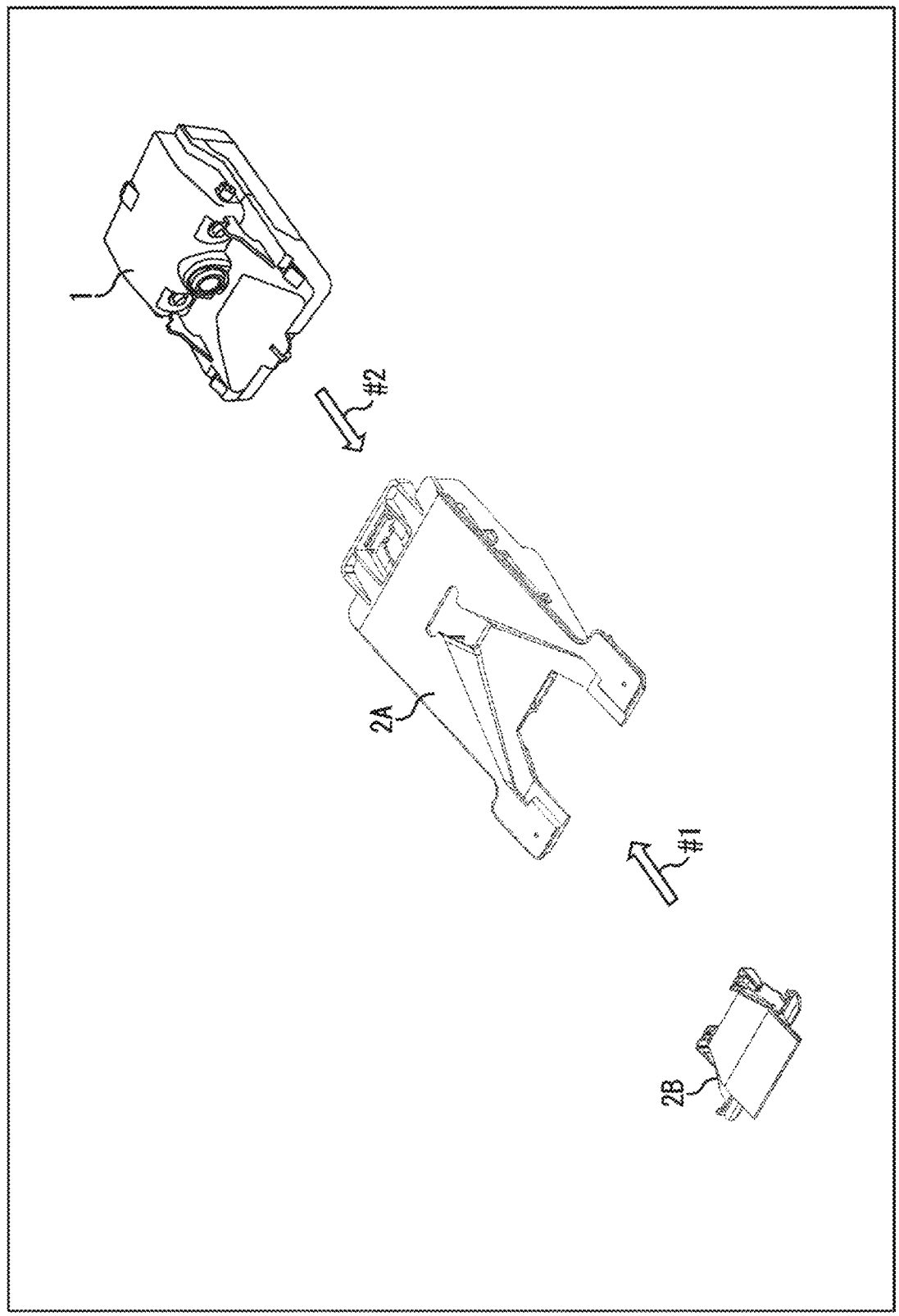
FIG. 10 is a view showing details of the way to mount the front camera.

FIG. 10 is a view showing details of the way to mount the front camera 1.

As shown in FIG. 10, the bracket 2 includes a main portion 2A and a sub portion 2B. The main portion 2A and the sub portion 2B respectively include resin or the like.

The main portion 2A is in a substantially wedge shape in the side view and has a shape with forward-extending thin small chip portions on left and right opposite ends formed by providing a recessed notch at a forward center. A hole portion is formed in a substantially central position of the main portion 2A.

A top face of the main portion 2A is stuck onto the windshield G. As shown with an arrow #1, the sub portion 2B is fitted into the recessed notch in the main portion 2A stuck onto the windshield G. On a top face of the sub portion 2B, a plate-shaped portion that has a shape substantially symmetrical to the shape of the notch of the main portion 2A is formed.

As shown with an arrow #2, the front camera 1 is inserted, from a back face side, into and mounted to the main portion 2A to which the sub portion 2B has been mounted, such that the front lens 21 is positioned in an opening formed at a center.

Figure 11:
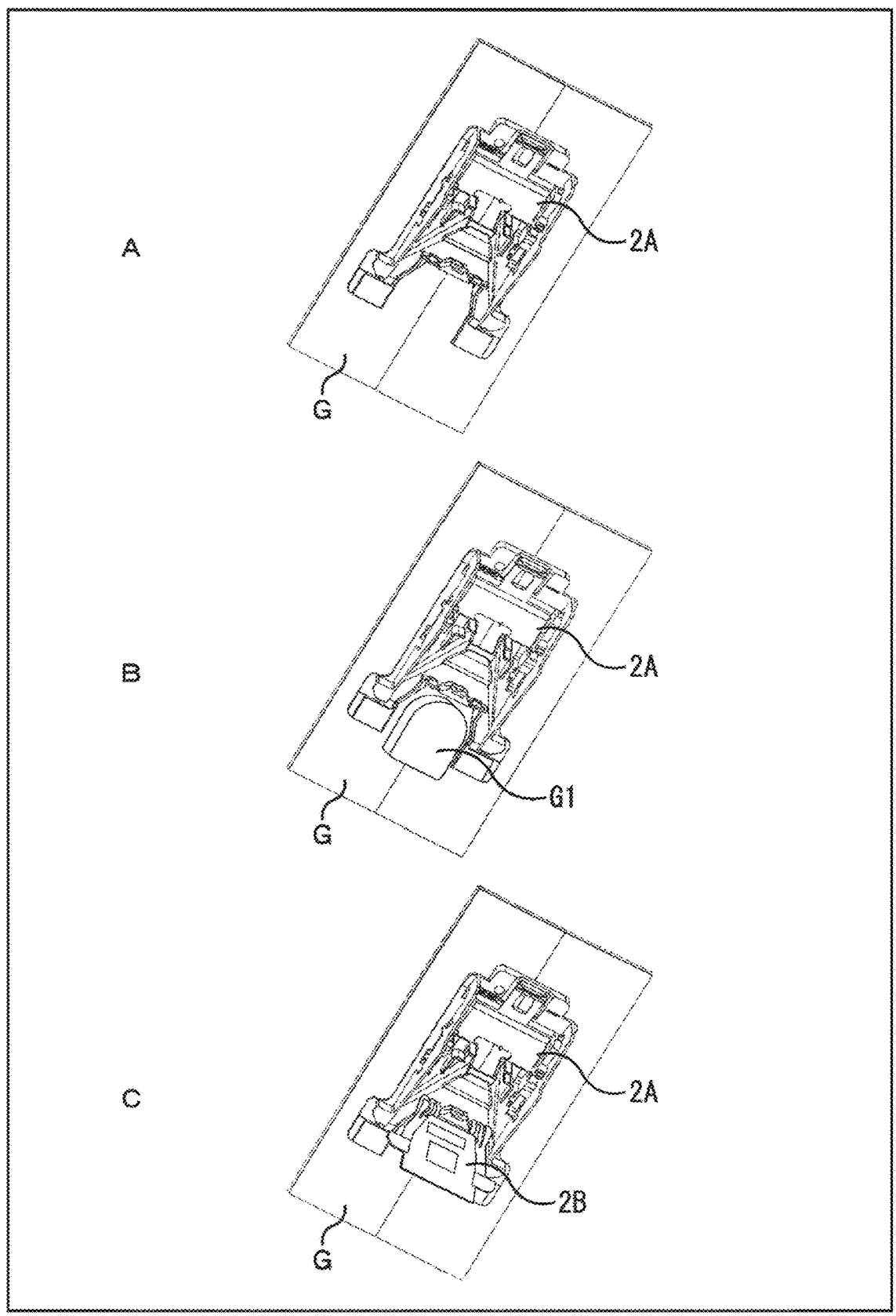
FIG. 11 contains views showing a mounting procedure of the front camera.
Figure 12:
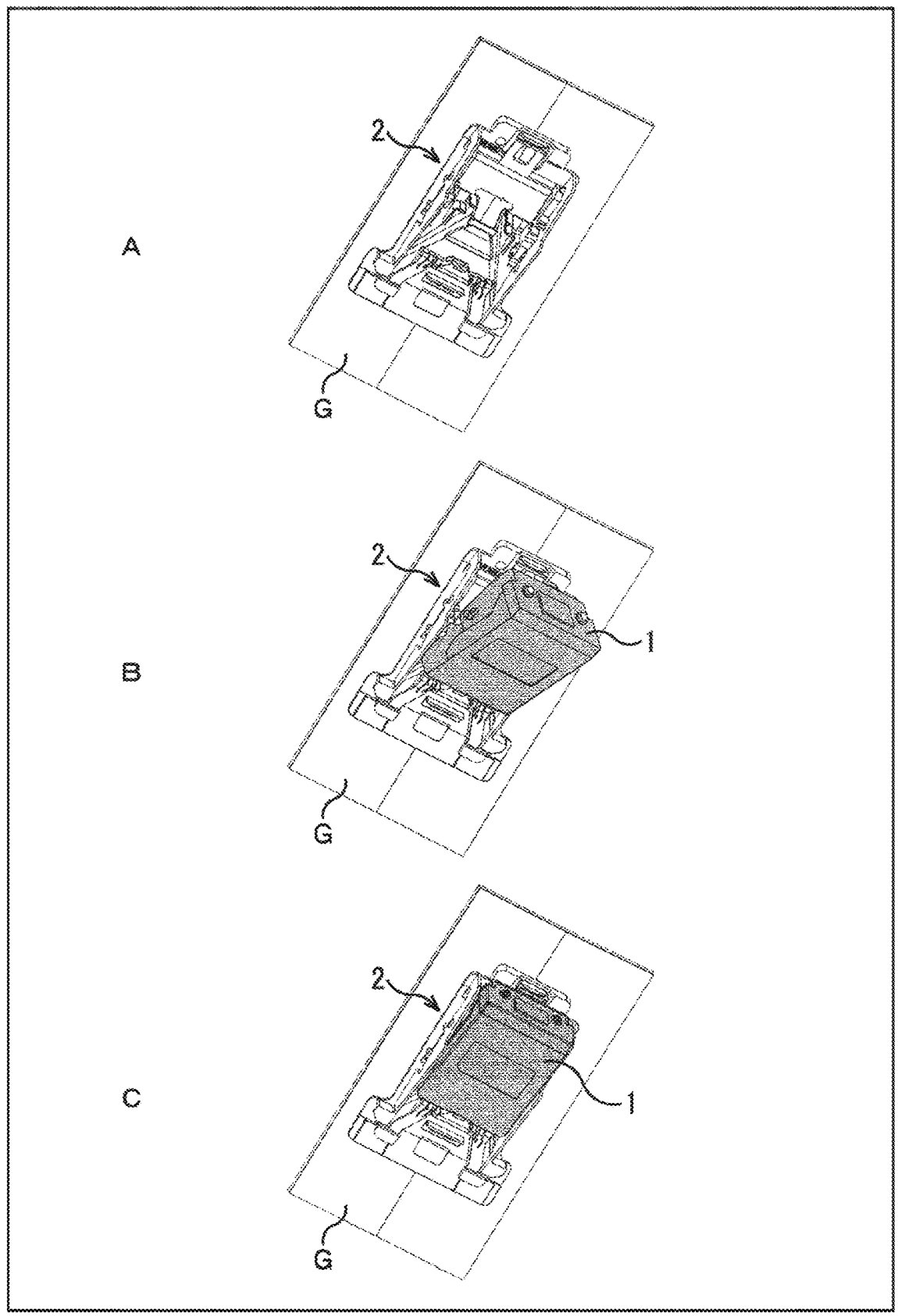
FIG. 12 contains views showing the mounting procedure of the front camera.

FIGS. 11 and 12 illustrate views showing a mounting procedure of the front camera 1.

As shown in A of FIG. 11, the main portion 2A is mounted to a predetermined position on the inner side of the windshield G by sticking the top face to the windshield G. Around the main portion 2A, various kinds of members to which other parts are to be mounted are mounted properly.

As shown in B of FIG. 11, a mount G1 is mounted to the forward central notched portion of the main portion 2A. The mount G1 is a part to which the rearview mirror is mounted.

The mount G1 is slid to a lower left side in the figure, and the sub portion 2B is fitted into the notch as shown in C of FIG. 11.

As a result of mounting the sub portion 2B, the bracket 2 is mounted to the windshield G as shown in A of FIG. 12. As shown in B and C of FIG. 12, the front camera 1 is mounted to the bracket 2.

<Configurations of Respective Faces of Bracket>

Configurations of respective faces of the main portion 2A forming the bracket 2 will be described.

Figure 13:
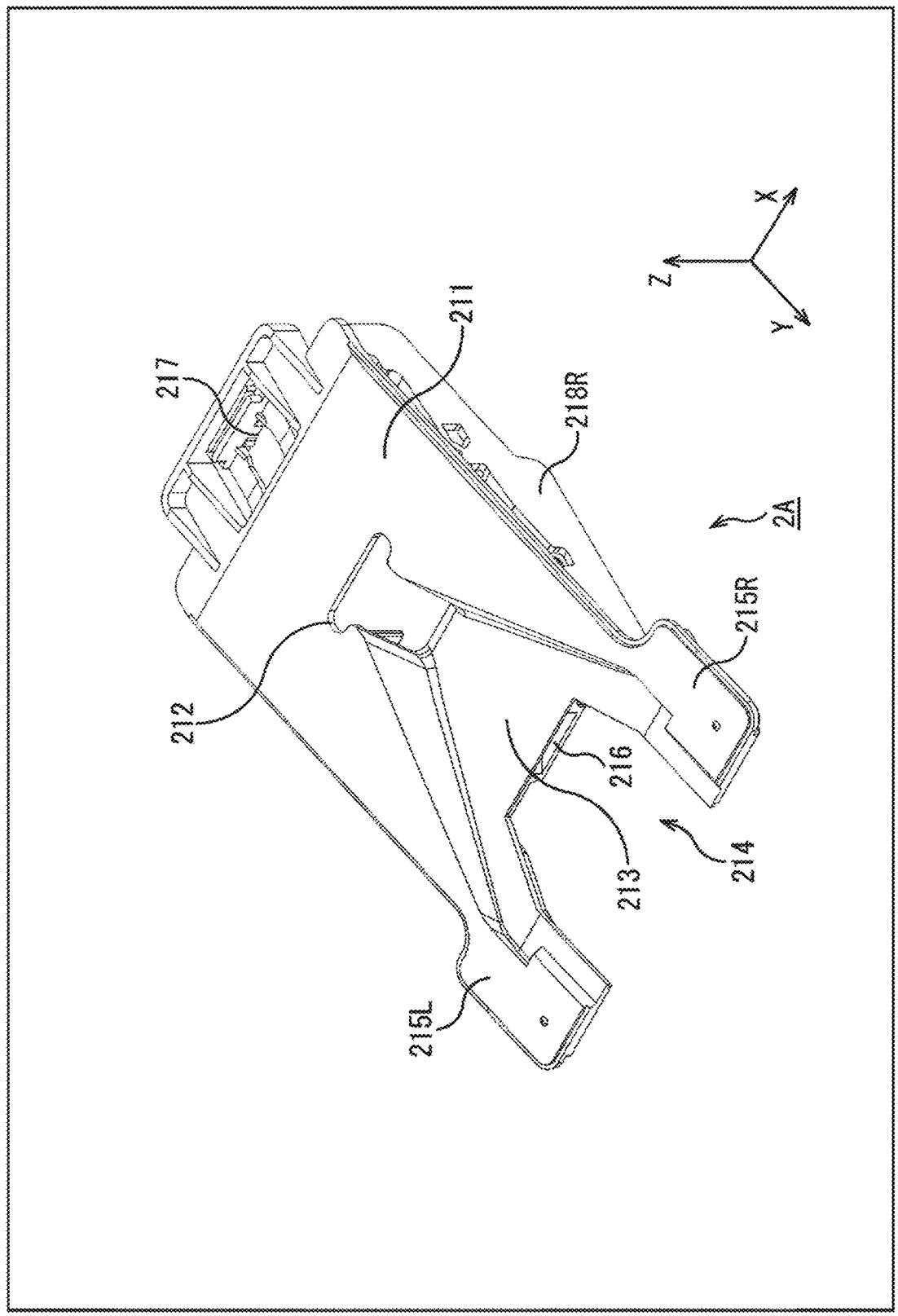
FIG. 13 is a perspective view of a main portion.
Figure 14:
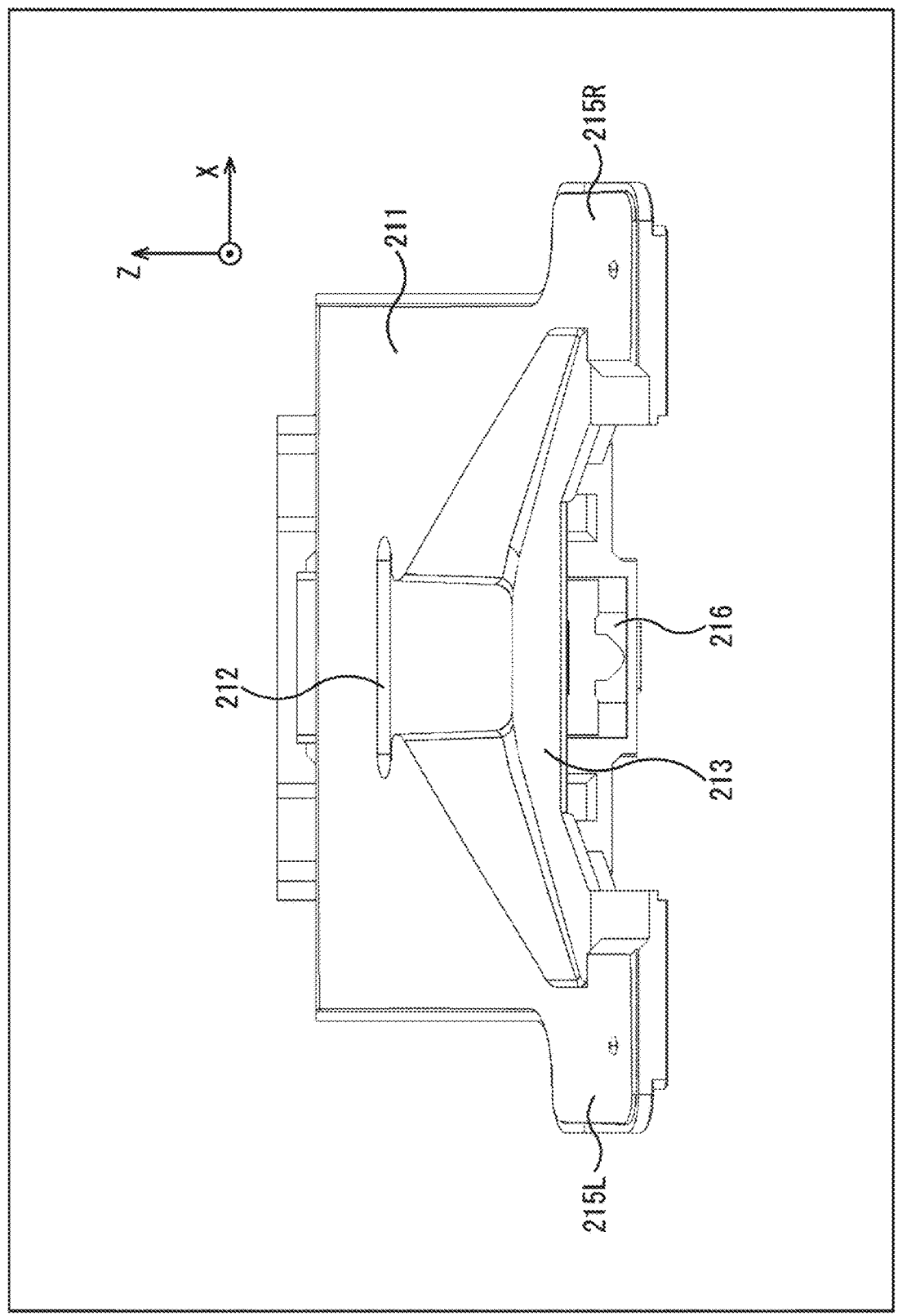
FIG. 14 is a front view of the main portion.
Figure 15:
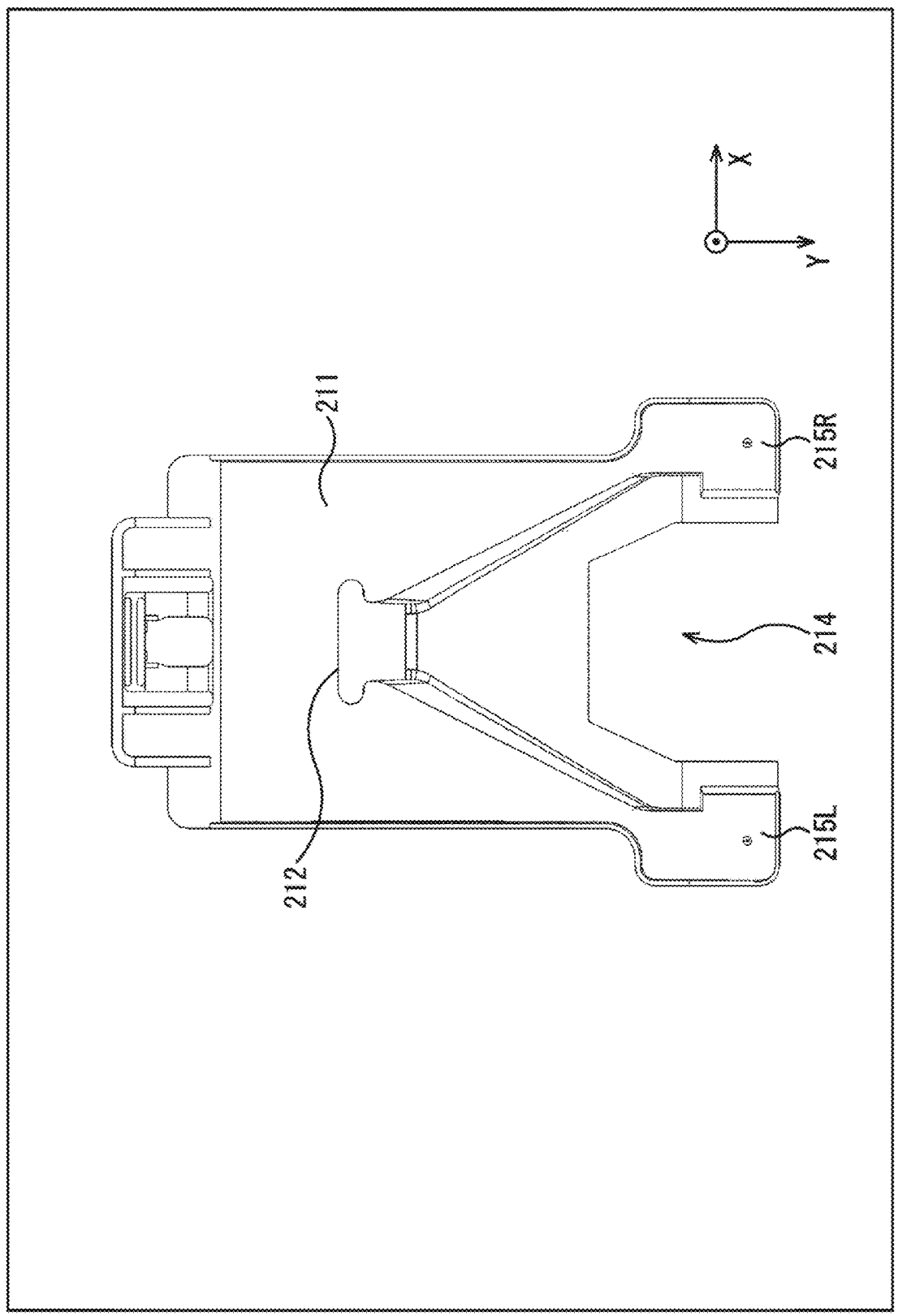
FIG. 15 is a plan view of the main portion.

FIG. 13 is a perspective view of the main portion 2A. FIG. 14 is a front view of the main portion 2A and FIG. 15 is a plan view of the main portion 2A.

Substantially at a center of a top face portion 211 forming a gentle slope and having a substantially rectangular shape that is long in the front-rear direction, the hole portion 212 is formed. The hole portion 212 has a substantially rounded-corner square shape in the front view (FIG. 14) and a flattened and substantially T shape in the plan view (FIG. 15). The hole portion 212 serves as an opening that opens a forward side of the lens 21 of the front camera 1.

A recessed portion 213 widening in the X-axis direction as it extends forward is formed on a forward side (in the normal direction along the Y-axis) of the hole portion 212. The recessed portion 213 is formed so as not to obstruct the angle of view of the front camera 1.

The recessed notch is formed at the forward center of the main portion 2A. The notch serves as a mounting portion 214 into which the sub portion 2B is fitted.

The left small chip portion 215L and the right small chip portion 215R are formed on opposite sides of the mounting portion 214. The left small chip portion 215L is connected to the top face portion 211 at an upper right portion in the plan view to form the same slope with the top face portion 211. The right small chip portion 215R is connected to the top face portion 211 at an upper left portion in the plan view to form the same slope with the top face portion 211.

As shown in FIG. 14, in a position on a bottom face side of the main portion 2A and facing the mounting portion 214, an insertion portion 216 having a hole portion is formed. The insertion portion 216 is in the position closer to the forward side than the hole portion 212. As will be described later in detail, the tip end protruding portion 124 provided to protrude on the forward side of the front camera 1 is inserted into the insertion portion 216. The hole portion formed in the insertion portion 216 serves as an insertion hole for the tip end protruding portion 124.

A back face holding portion 217 that holds an upper portion of the back face of the front camera 1 with a lug portion is provided on the back face side of the main portion 2A.

Figure 16:
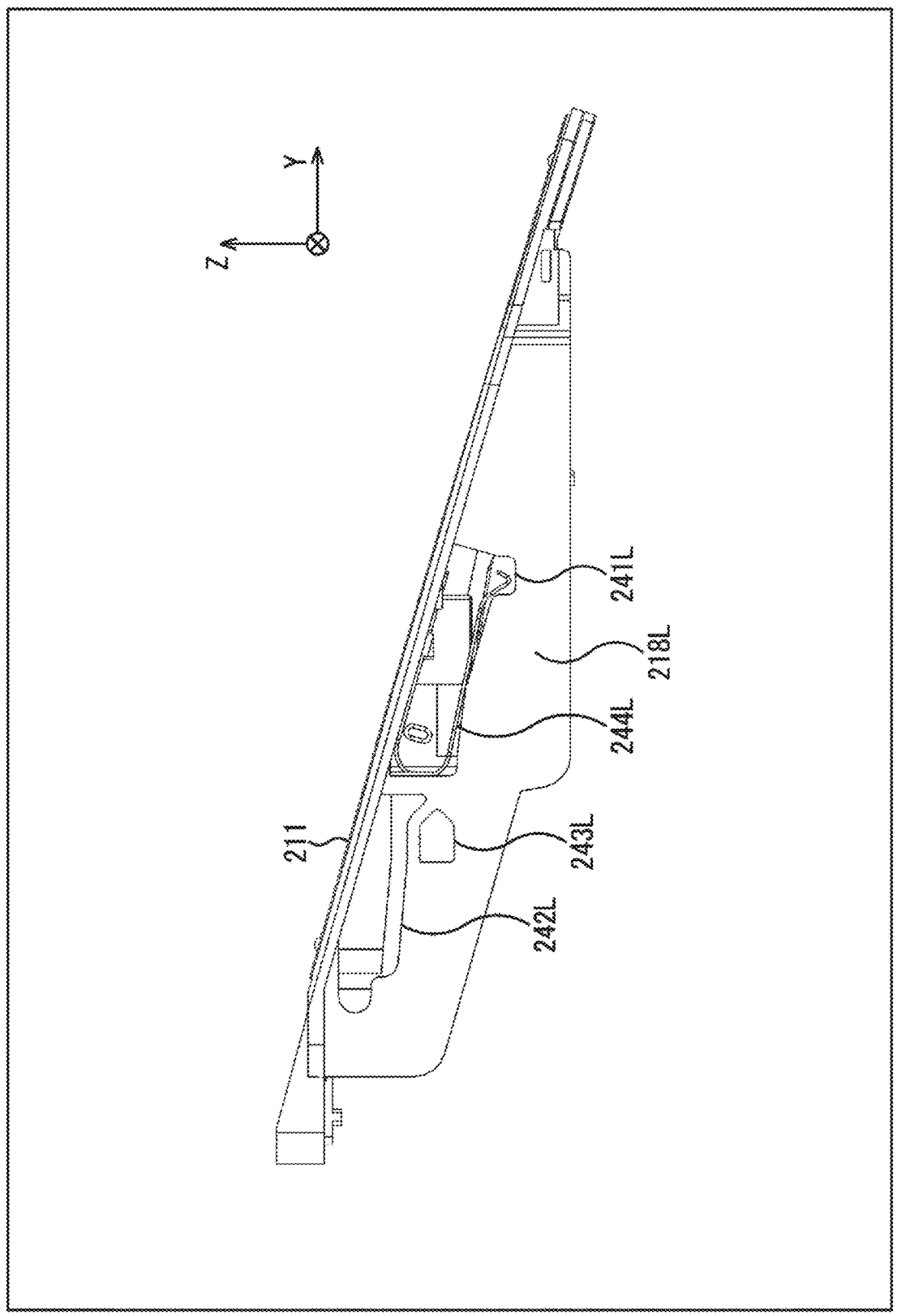
FIG. 16 is a left side view of the main portion.
Figure 17:
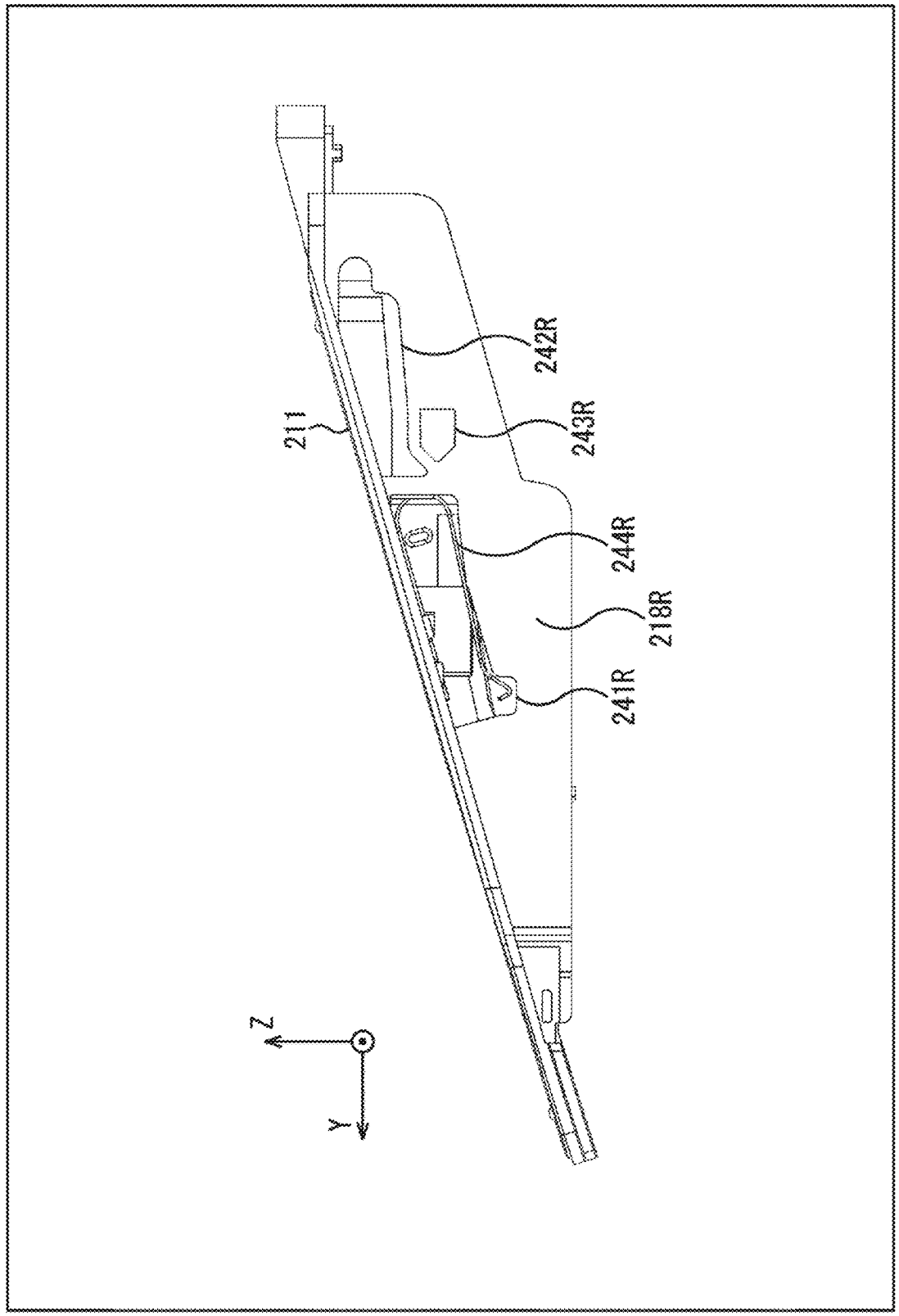
FIG. 17 is a right side view of the main portion.

FIG. 16 is a left side view of the main portion 2A and FIG. 17 is a right side view of the main portion 2A.

At a position slightly recessed from a left end (an end on a viewer's side in FIG. 16) of the top face portion 211, a left side face portion 218L having a thin plate shape is formed, side by side with a left edge of the top face portion 211, to hang down from a back surface of the top face portion 211. As shown in FIG. 16, the left side face portion 218L forms a substantially wedge-shaped wall face in the side view.

Substantially at a center of the left side face portion 218L, a hole portion 241L extending in the front-rear direction is formed along the back surface of the top face portion 211. In a rear of the hole portion 241L, a hole portion 242L that is about the same size as the hole portion 241L is formed along the back surface of the top face portion 211.

The hole portion 241L and the hole portion 242L function as vent holes. The hole portion 241L has a function as a mounting hole into which a flat spring 244L is mounted from a side of the left side face as well as the function as the vent hole.

Below the hole portion 242L, a pentagonal (home-base-shaped) small hole portion 243L with a V-shaped notch oriented forward (in the normal direction along the Y-axis) is formed. The small hole portion 243L is at a position closer to the rear side than a position of the flat spring 244L. As will be described later in detail, the protruding portion 125L provided to a left side face of the front camera 1 is inserted into the small hole portion 243L.

A right side face of the main portion 2A has a similar configuration to the left side face.

In other words, at a position slightly recessed from a right end of the top face portion 211, a right side face portion 218R having a thin plate shape is formed, side by side with a right edge of the top face portion 211, to hang down from the back surface of the top face portion 211. As shown in FIG. 17, the right side face portion 218R forms a substantially wedge-shaped wall face in the side view.

Substantially at a center of the right side face portion 218R, a hole portion 241R extending in the front-rear direction is formed along the back surface of the top face portion 211. In a rear of the hole portion 241R, a hole portion 242R that is about the same size as the hole portion 241R is formed along the back surface of the top face portion 211.

The hole portion 241R and the hole portion 242R function as vent holes. The hole portion 241R has a function as a mounting hole into which a flat spring 244R is mounted from a side of the right side face as well as the function as the vent hole.

Below the hole portion 242R, a pentagonal small hole portion 243R with a V-shaped notch oriented forward (in the normal direction along the Y-axis) is formed. The small hole portion 243R is at a position closer to the rear side than a position of the flat spring 244R. As will be described later in detail, the protruding portion 125R provided to a right side face of the front camera 1 is inserted into the small hole portion 243R.

Figure 18:
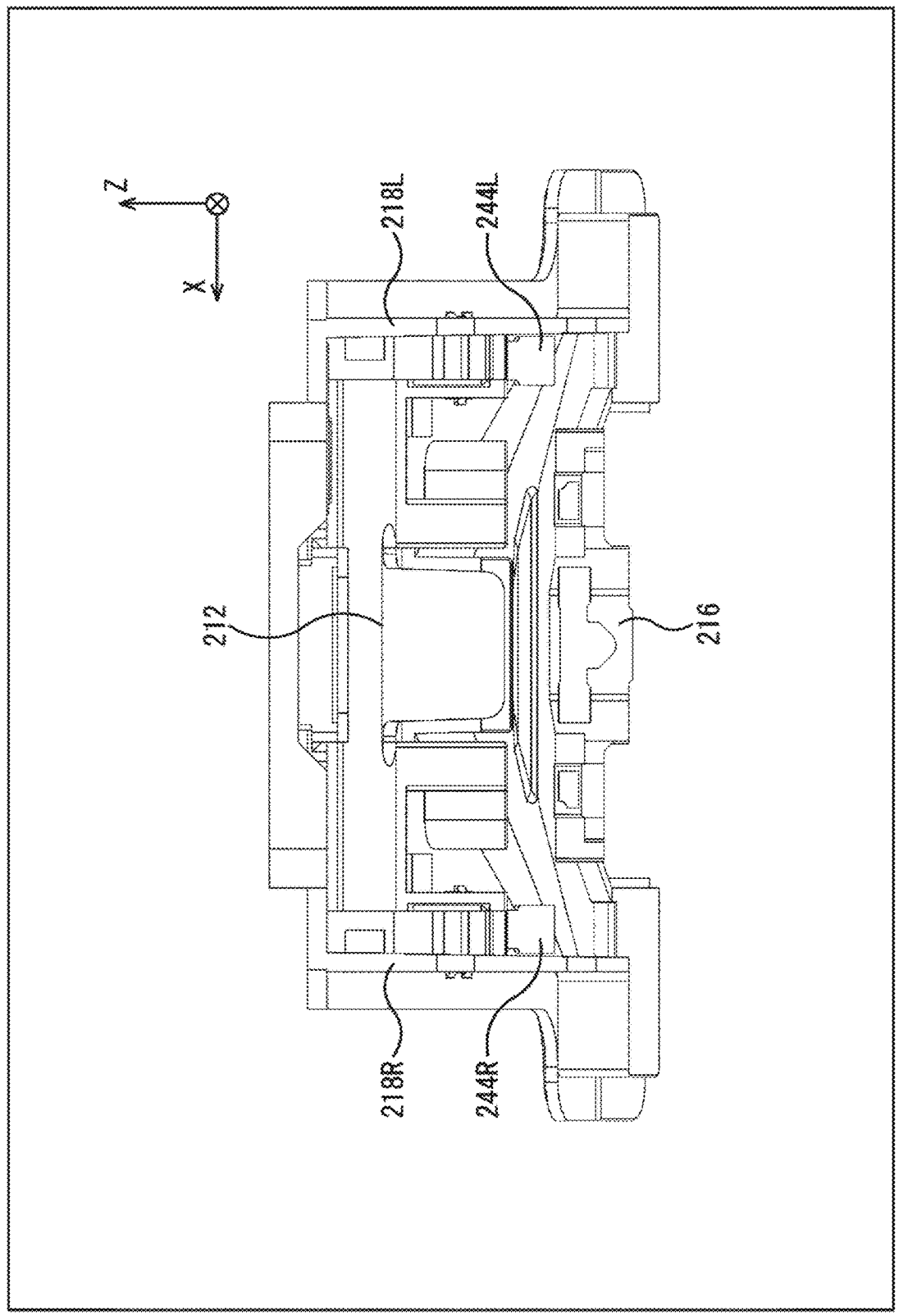
FIG. 18 is a back view of the main portion.
Figure 19:
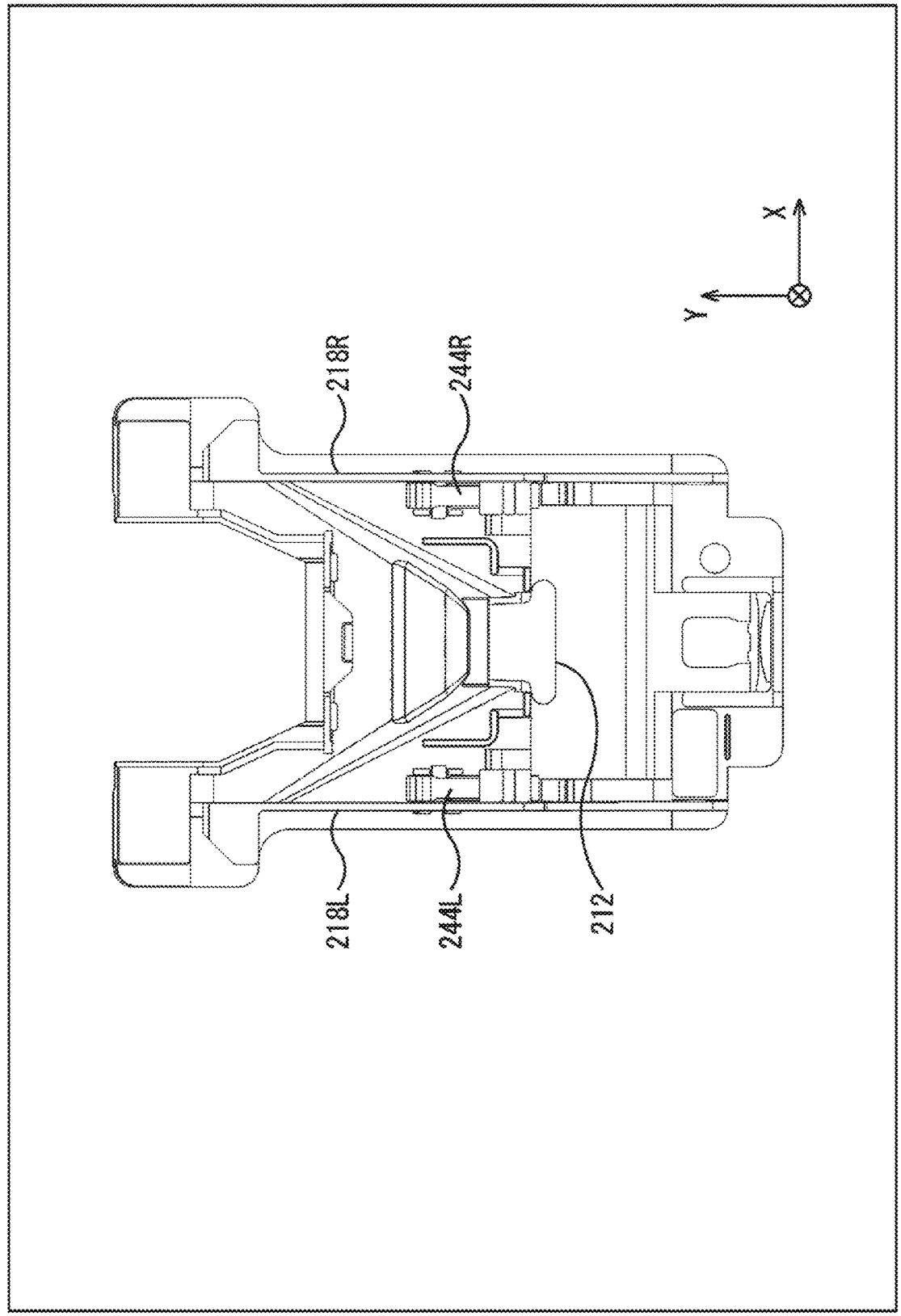
FIG. 19 is a bottom view of the main portion.

FIG. 18 is a back view of the main portion 2A, and FIG. 19 is a bottom view of the main portion 2A.

As shown in FIGS. 18 and 19, the flat spring 244L and the flat spring 244R including metal narrow thin plates are mounted by members provided to the bottom face such that long-side directions are oriented in the front-rear direction (Y-axis direction).

<Front Camera Holding Mechanisms>

Here, holding mechanisms for the front camera 1 will be described.

Figure 20:
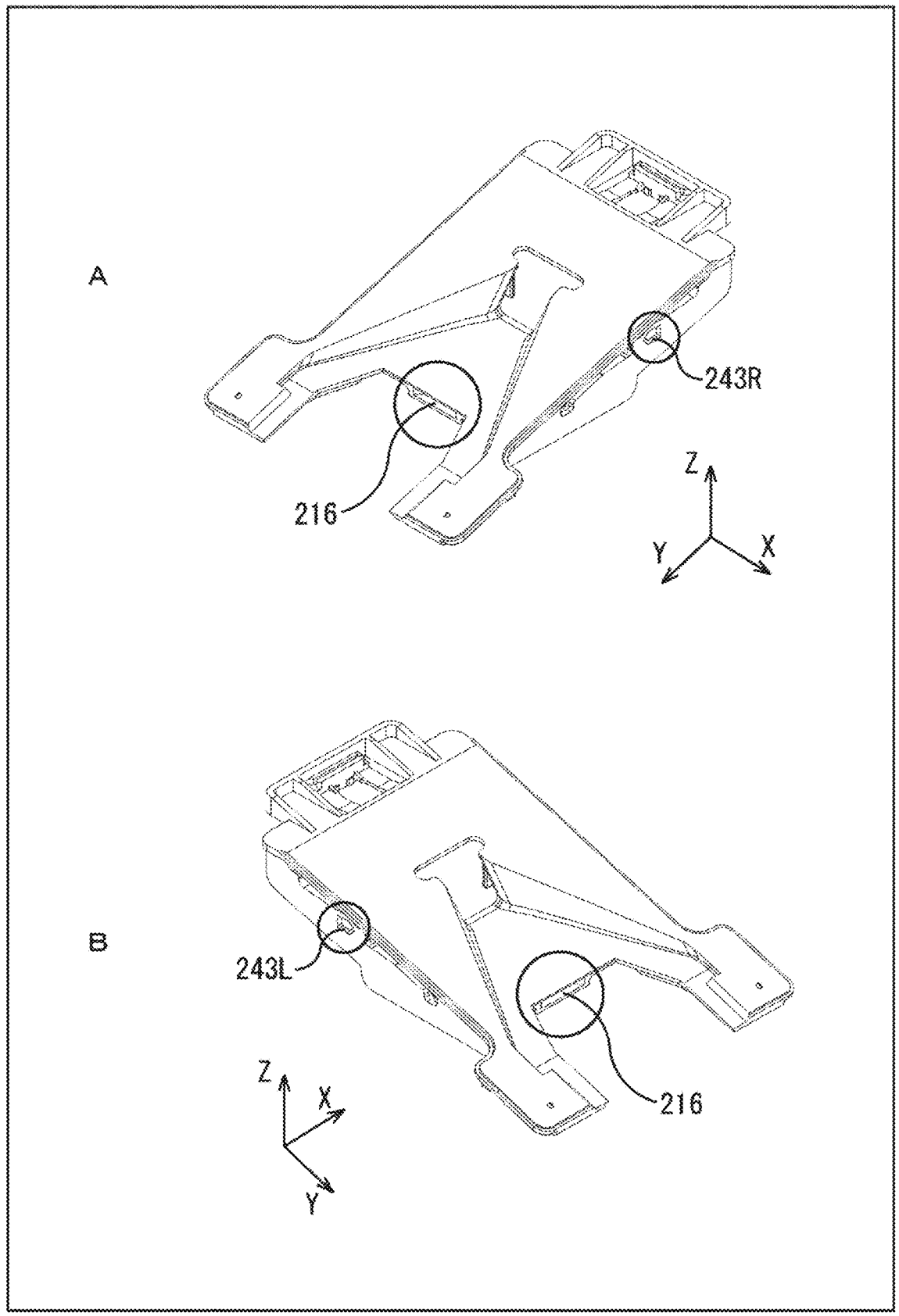
FIG. 20 contains views showing an example of positions of holding mechanisms of the bracket.

FIG. 20 contains views showing an example of positions of the holding mechanisms of the bracket 2 (the main portion 2A).

As shown in circles in A and B of FIG. 20, the bracket 2 is provided with the insertion portion 216 substantially at a center on a front face side, the small hole portion 243L in the left side face portion 218L, and the small hole portion 243R in the right side face portion 218R, as the holding mechanisms for the front camera 1.

Figure 21:
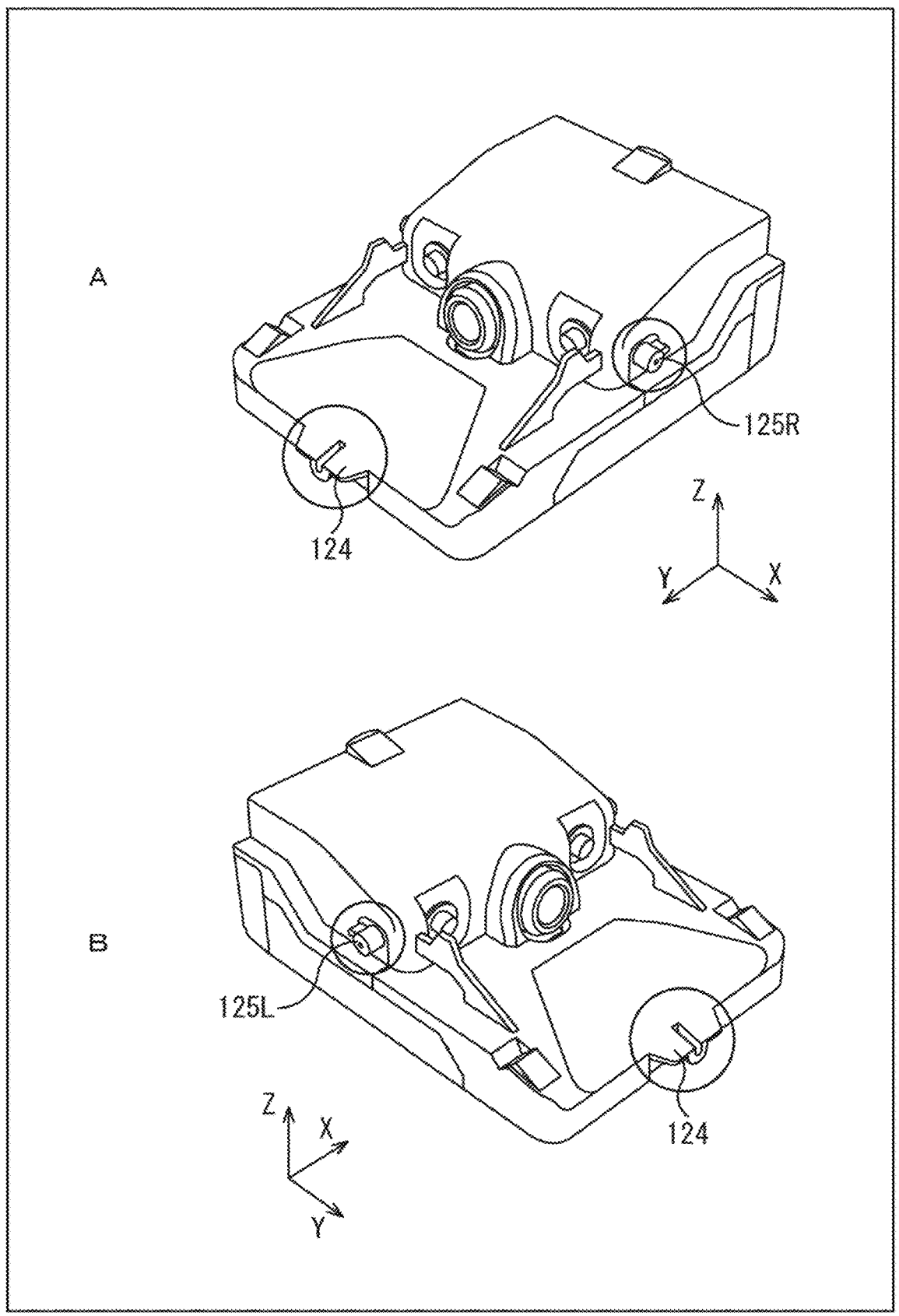
FIG. 21 contains views showing an example of positions of protruding portions of the front camera.

At positions of the front camera 1 corresponding to the respective positions of the insertion portion 216, the small hole portion 243L, and the small hole portion 243R, the tip end protruding portion 124, the protruding portion 125L, and the protruding portion 125R are provided as shown in the circles in A and B of FIG. 21.

The front camera 1 is mounted to the bracket 2 with the tip end protruding portion 124 inserted into the insertion portion 216 and the protruding portions 125L and 125R inserted into the small hole portions 243L and 243R, respectively. The front camera 1 is positionally aligned by coming in contact with the bracket 2 mainly at three points, i.e., at a forward center and left and right opposite sides.

Details of the three contact portions will be described.

Figure 22:
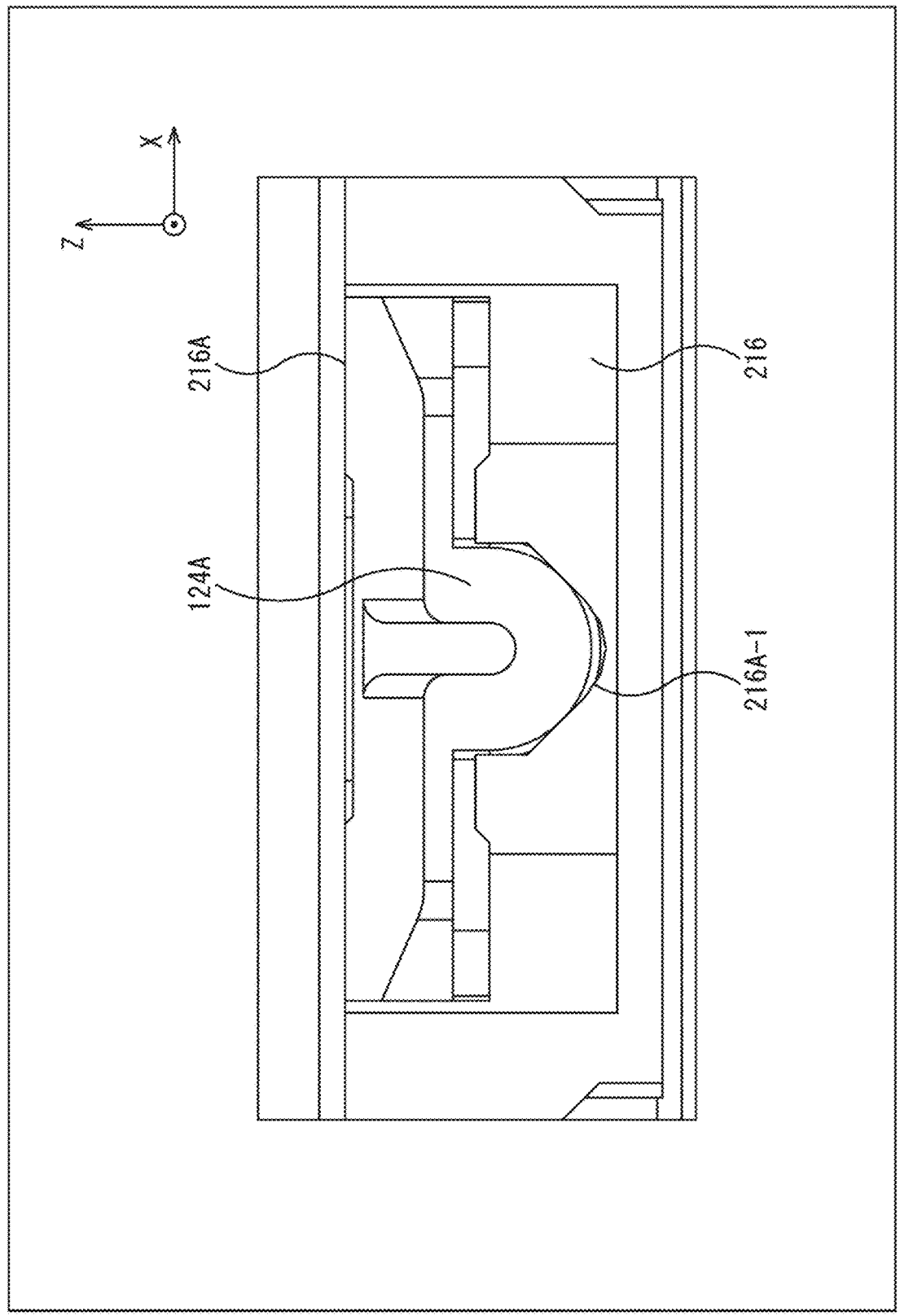
FIG. 22 is an enlarged view of a contact portion at a forward center when the front camera is mounted.

FIG. 22 is an enlarged view of the contact portion at the forward center with the front camera 1 mounted.

In the insertion portion 216 of the bracket 2, a hole portion 216A in a substantially flattened vertically-inverted (in the Z-axis direction) bilaterally-symmetric victory stand shape is formed. A V-shaped notch portion 216A-1 is formed at the hole portion 216A.

In a case where the tip end protruding portion 124 of the front camera 1 is inserted into the hole portion 216A, the semicylindrical protruding portion 124A formed on the bottom face side of the tip end protruding portion 124 is disposed on the notch portion 216A-1 as shown in FIG. 22. The cylindrical face of the protruding portion 124A comes in contact with inclined portions of the notch portion 216A-1.

Figure 23:
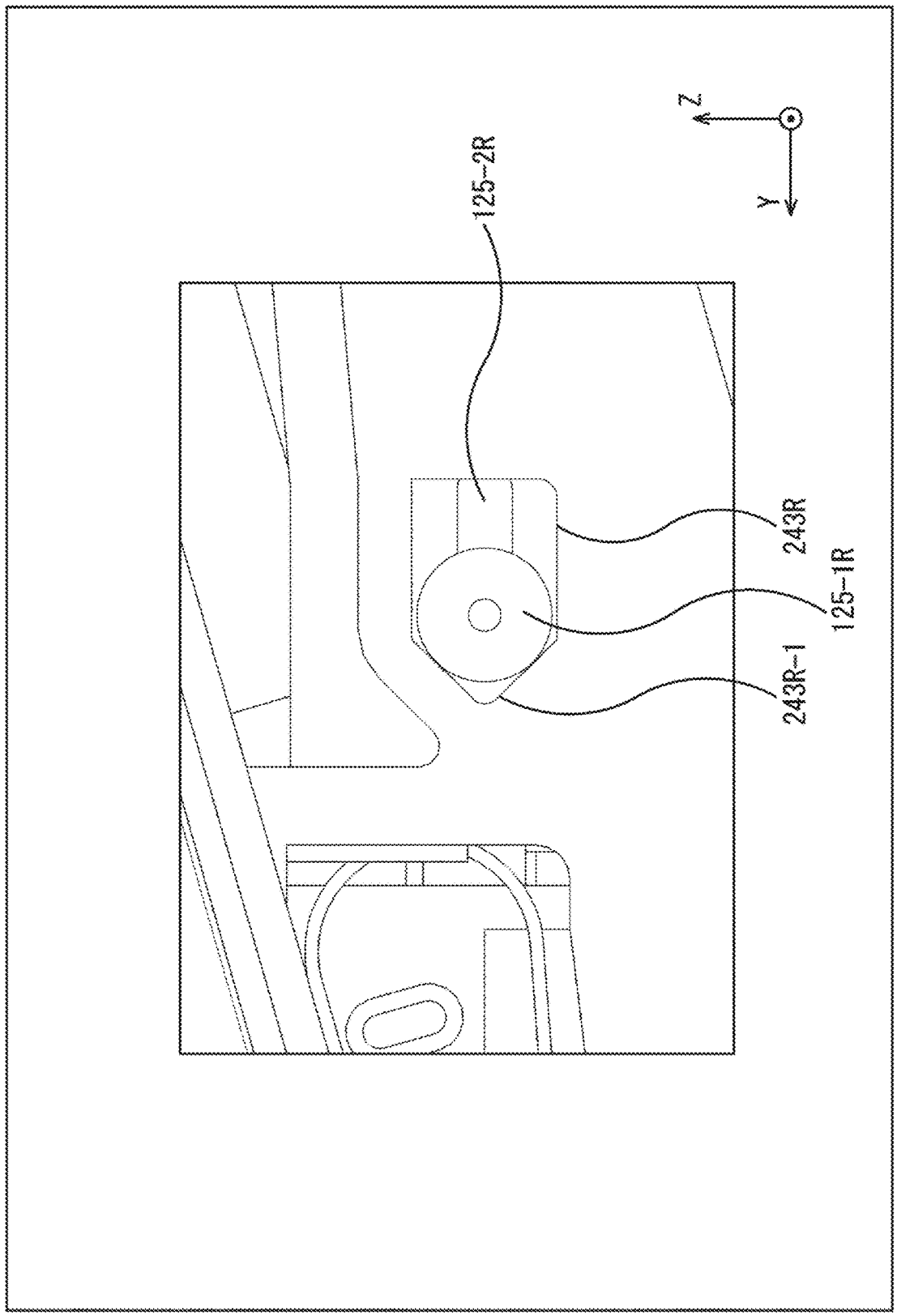
FIG. 23 is an enlarged view of a contact portion on a right side when the front camera is mounted.

FIG. 23 is an enlarged view of the contact portion on the right side with the front camera 1 mounted.

In the right side face portion 218R of the bracket 2, the pentagonal small hole portion 243R with the V-shaped notch portion 243R-1 oriented forward is formed.

As shown in FIG. 23, in a case where the protruding portion 125R of the front camera 1 is inserted into the small hole portion 243R, the cylindrical protruding portion 125-

1R forming the protruding portion 125R is disposed on a forward side (a left side in the figure). As shown in FIG. 23, a left side of the cylindrical face of the protruding portion 125-1R comes in contact with inclined portions of the notch portion 243R-1 at two points.

Although it is not shown in the figure, the contact portion on the left side is similar.

In other words, in a case where the protruding portion 125L of the front camera 1 is inserted into the small hole portion 243L, the cylindrical protruding portion 125-1L forming the protruding portion 125L is disposed on a forward side. A cylindrical face of the protruding portion 125-1L comes in contact with inclined portions of the notch portion at two points in the left side view.

At each of the three contact portions, a force for biasing (pressing) the cylindrical face of the front camera 1 toward the V-shaped notch portion of the bracket 2 is applied to the front camera 1 by the flat spring provided to the bracket 2.

Figure 24:
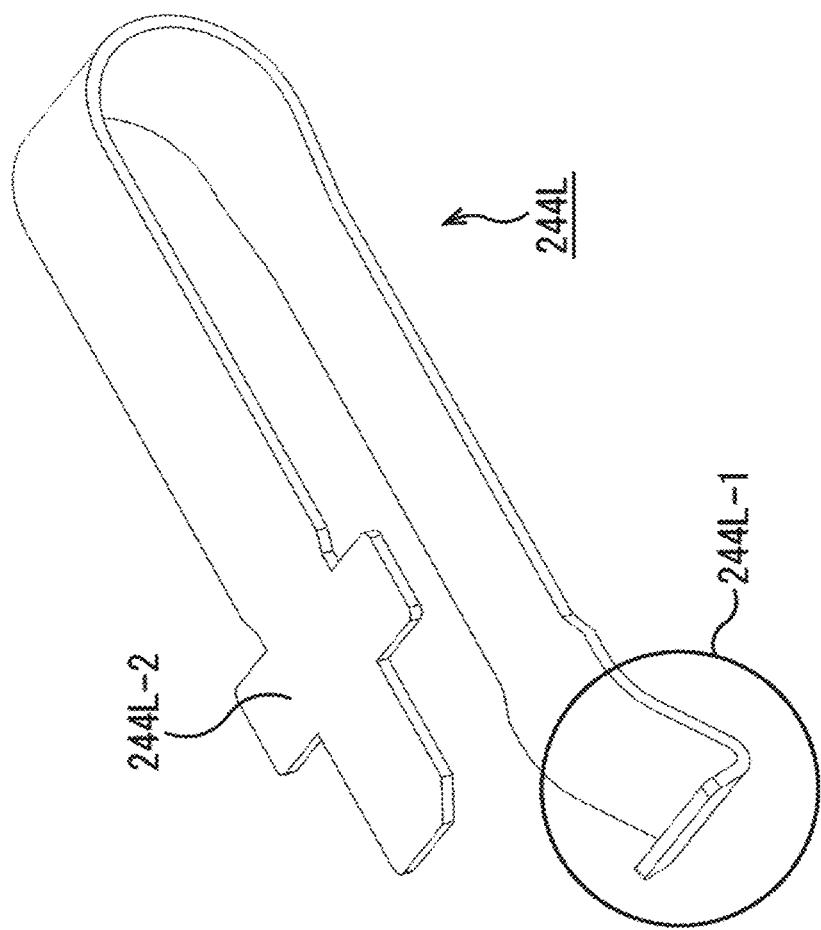
FIG. 24 is an enlarged perspective view of a flat spring.

FIG. 24 is an enlarged perspective view of the flat spring 244L. The flat spring 244R has a similar configuration.

The flat spring 244L is formed by bending a narrow metal plate into a substantially U shape in a side view.

A portion near a lower tip end of the flat spring 244L is curved obtusely and outward, and a pressing portion 244 L-1 having a substantially V shape in the side view is formed at a tip of the portion. Near an upper tip end of the flat spring 244L, a fixing portion 244L-2 having a cross shape in a plan view is formed. By fitting the fixing portion 244L-2 into the member provided to the bottom face of the main portion 2A, the flat spring 244L is mounted to the main portion 2A.

Figure 25:
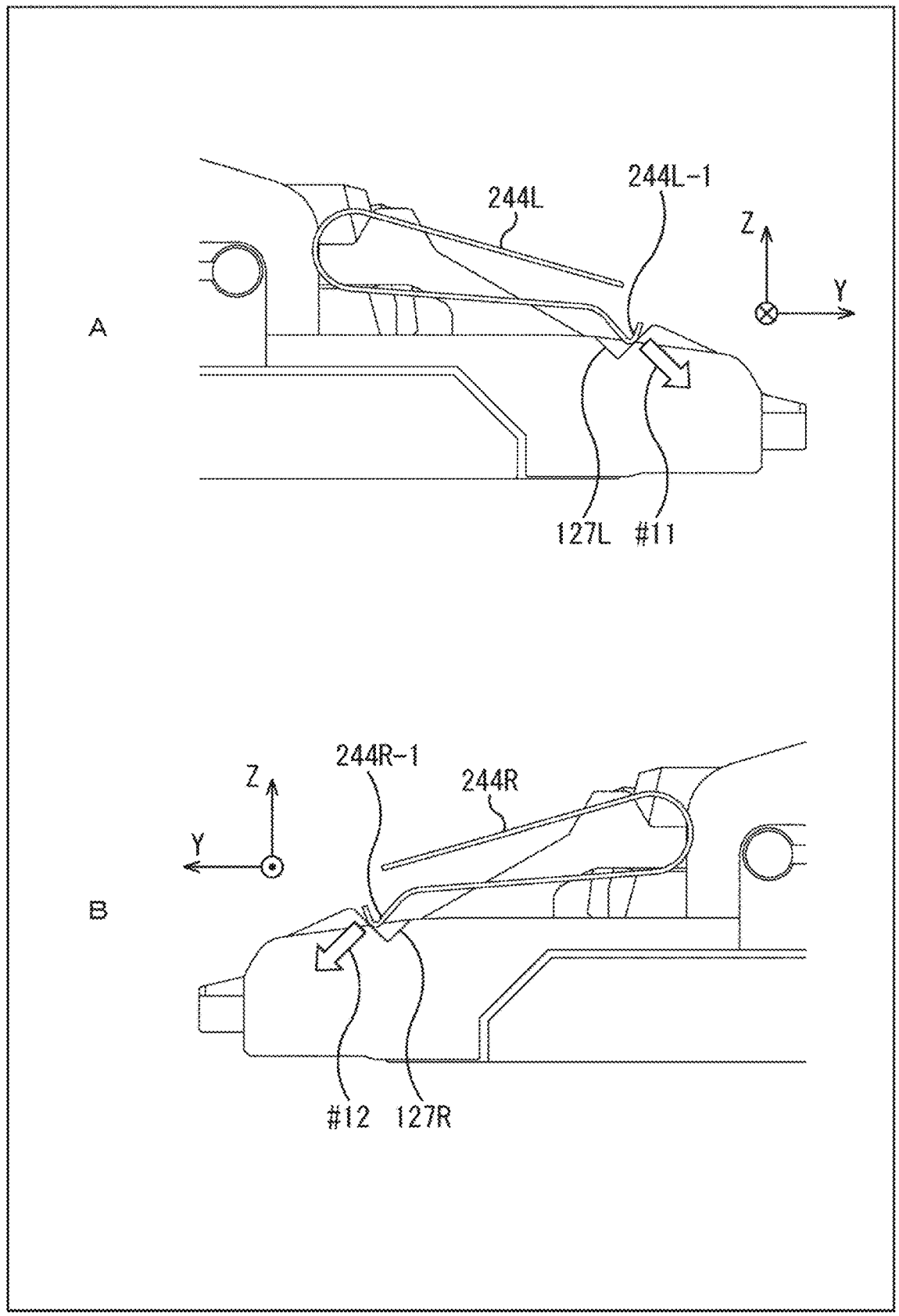
FIG. 25 contains views of directions of forces applied to the front camera.

FIG. 25 contains views of directions of forces applied to the front camera 1.

When the front camera 1 is mounted to the bracket 2, the flat spring 244L and the flat spring 244R provided to the bracket 2 are curved and resilient forces are generated by the flat spring 244L and the flat spring 244R.

As shown in A of FIG. 25, the pressing portion 244L-1 at the tip end of the flat spring 244L comes in contact with a slope of the notch portion 127L formed at the forward left end of the front camera 1. A force for pressing forward and diagonally downward, as shown with an arrow #11, is applied from the pressing portion 244L-1 to the slope of the notch portion 127L. The force of the pressing portion 244L-1 for pressing the front camera 1 includes a component of force for pressing forward and a component of force for pressing downward.

On the other hand, as shown in B of FIG. 25, a pressing portion 244R-1 at a tip end of the flat spring 244R comes in contact with a slope of the notch portion 127R formed at the forward right end of the front camera 1. A force for pressing forward and diagonally downward as shown with an arrow #12 is applied from the pressing portion 244R-1 to the slope of the notch portion 127R. The force of the pressing portion 244R-1 for pressing the front camera 1 includes a component of force for pressing forward and a component of force for pressing downward.

Figure 26:
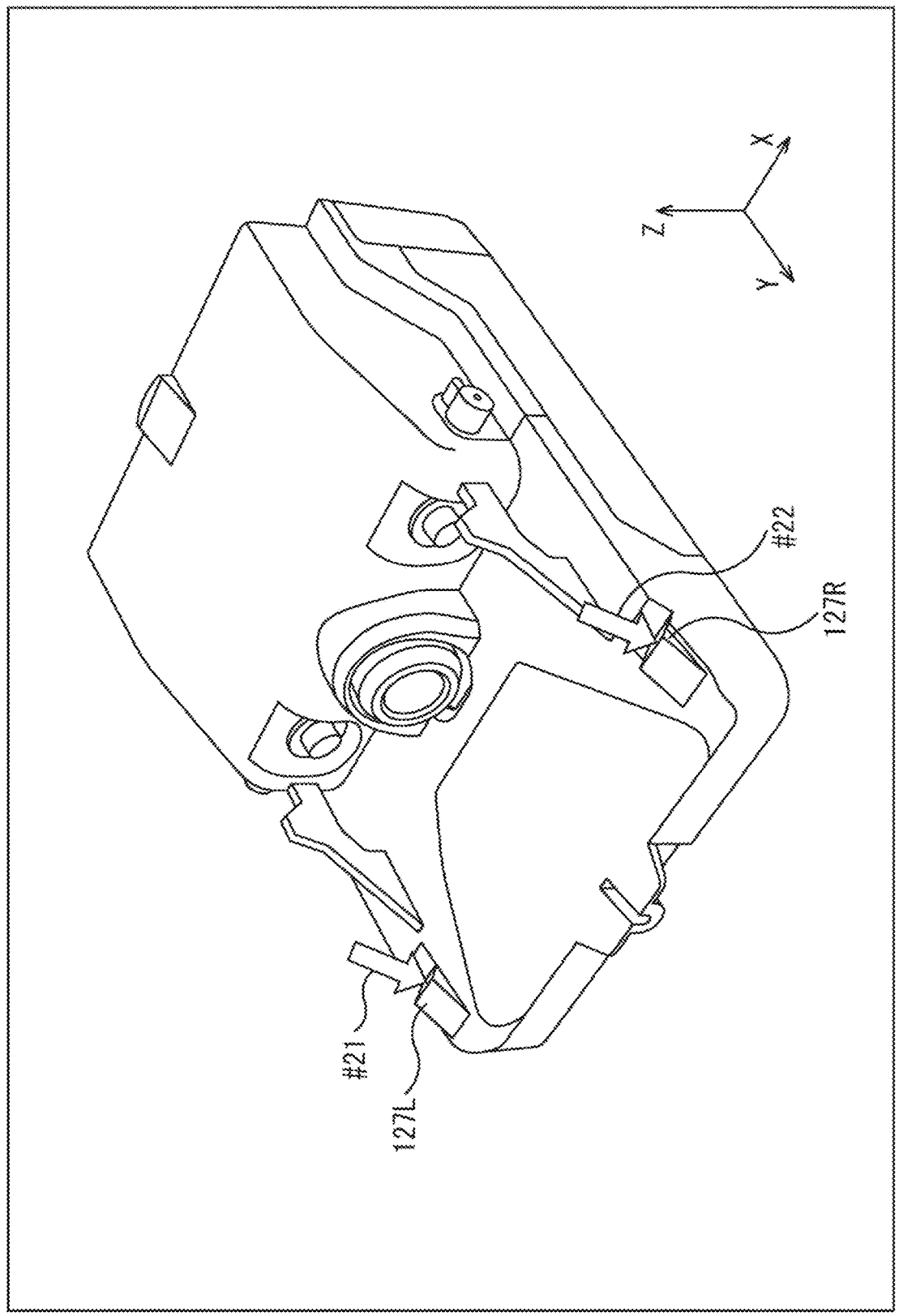
FIG. 26 is a perspective view of the forces applied to the front camera.

The forces applied from the flat springs 244L, 244R to the front camera 1 in a perspective view are as shown in FIG. 26. The forward left end of the front camera 1 is pressed forward and diagonally downward, as shown with an arrow #21, by the flat spring 244L and the forward right end of the front camera 1 is pressed forward and diagonally downward, as shown with an arrow #22, by the flat spring 244R.

As a result of the pressing of the forward left and right opposite ends of the front camera 1 forward and diagonally downward, forces corresponding to the pressing are generated at the contact portions between the front camera 1 and the bracket 2.

Figure 27:
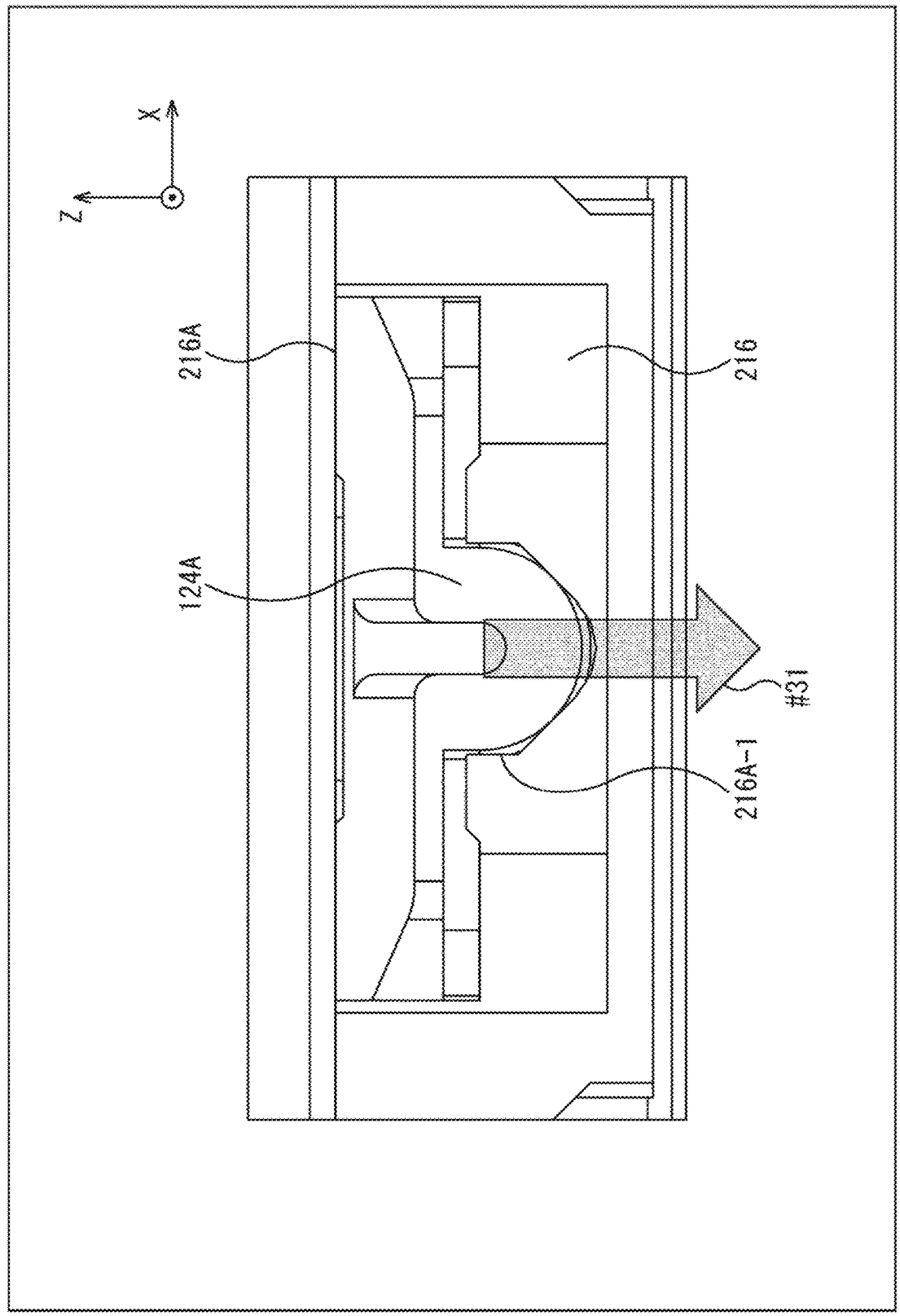
FIG. 27 is a view of an example of a force generated at the contact portion between the front camera and the bracket.
Figure 28:
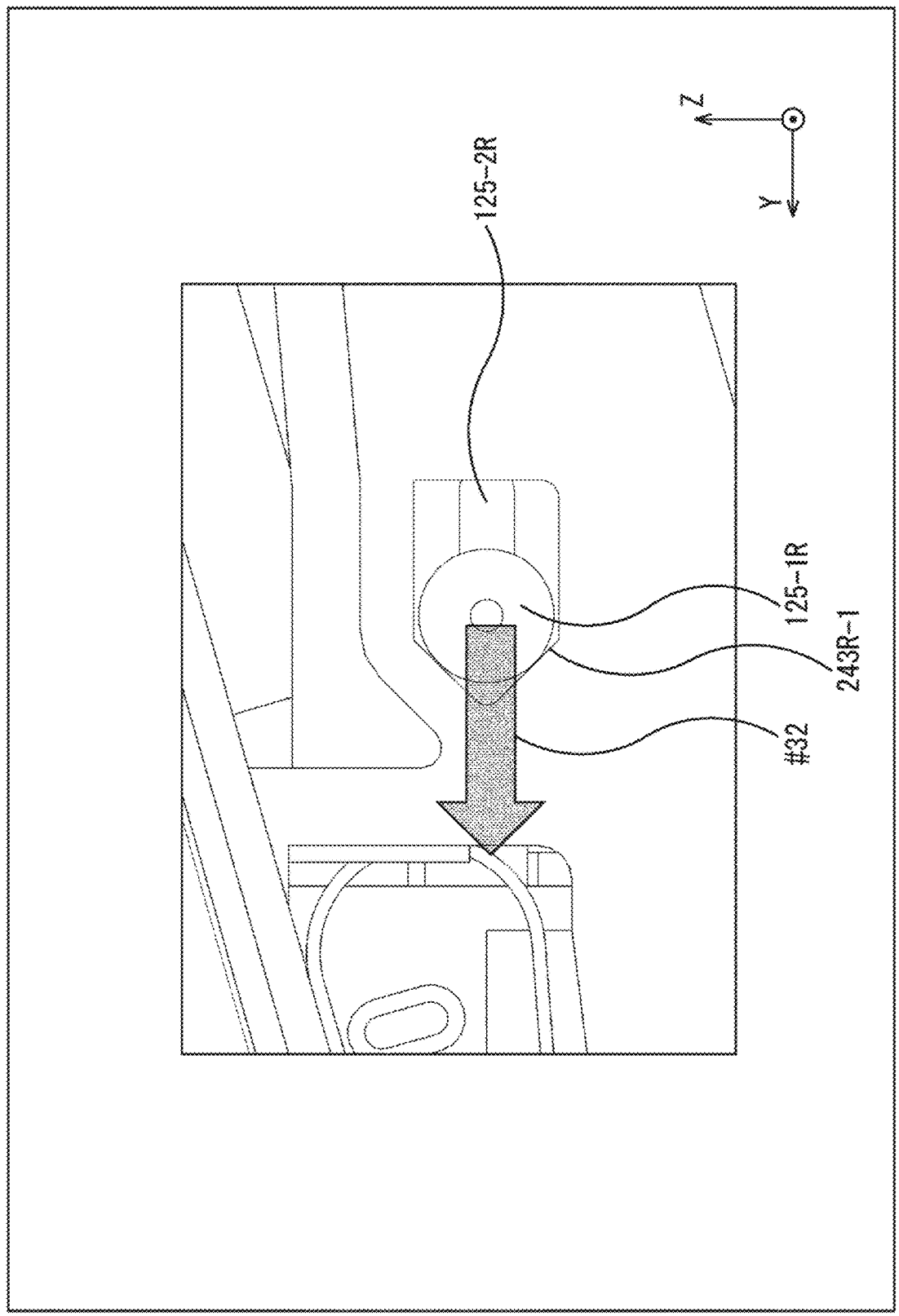
FIG. 28 is a view of an example of a force generated at the contact portion between the front camera and the bracket.

FIGS. 27 and 28 are views of examples of the forces generated at the contact portions between the front camera 1 and the bracket 2.

As shown with an arrow #31 in FIG. 27, at the forward central contact portion between the front camera 1 and the bracket 2, the force of the cylindrical face of the protruding portion 124A for pressing the inclined portions of the notch portion 216A-1 is generated. Because the cylindrical face of the protruding portion 124A and the inclined portions of the notch portion 216A-1 are in contact with each other at two points, a position of the protruding portion 124A is uniquely determined by the force for pressing downward.

On the other hand, as shown with an arrow #32 in FIG. 28, at the contact portion on the right side between the front camera 1 and the bracket 2, the force of the cylindrical face of the protruding portion 125-1R for pressing the inclined portions of the notch portion 243R-1 is generated. Because the cylindrical face of the protruding portion 125-1R and the inclined portions of the notch portion 243R-1 are in contact with each other at two points, a position of the protruding portion 125-1R is uniquely determined by the force for pressing forward (leftward in the figure).

Similarly, at the contact portion on the left side between the front camera 1 and the bracket 2, because the cylindrical face of the protruding portion 125-1L and the inclined portions of the notch portion 243L-1 are in contact with each other at two points, a position of the protruding portion 125-1L is uniquely determined by the force for pressing forward.

Figure 29:
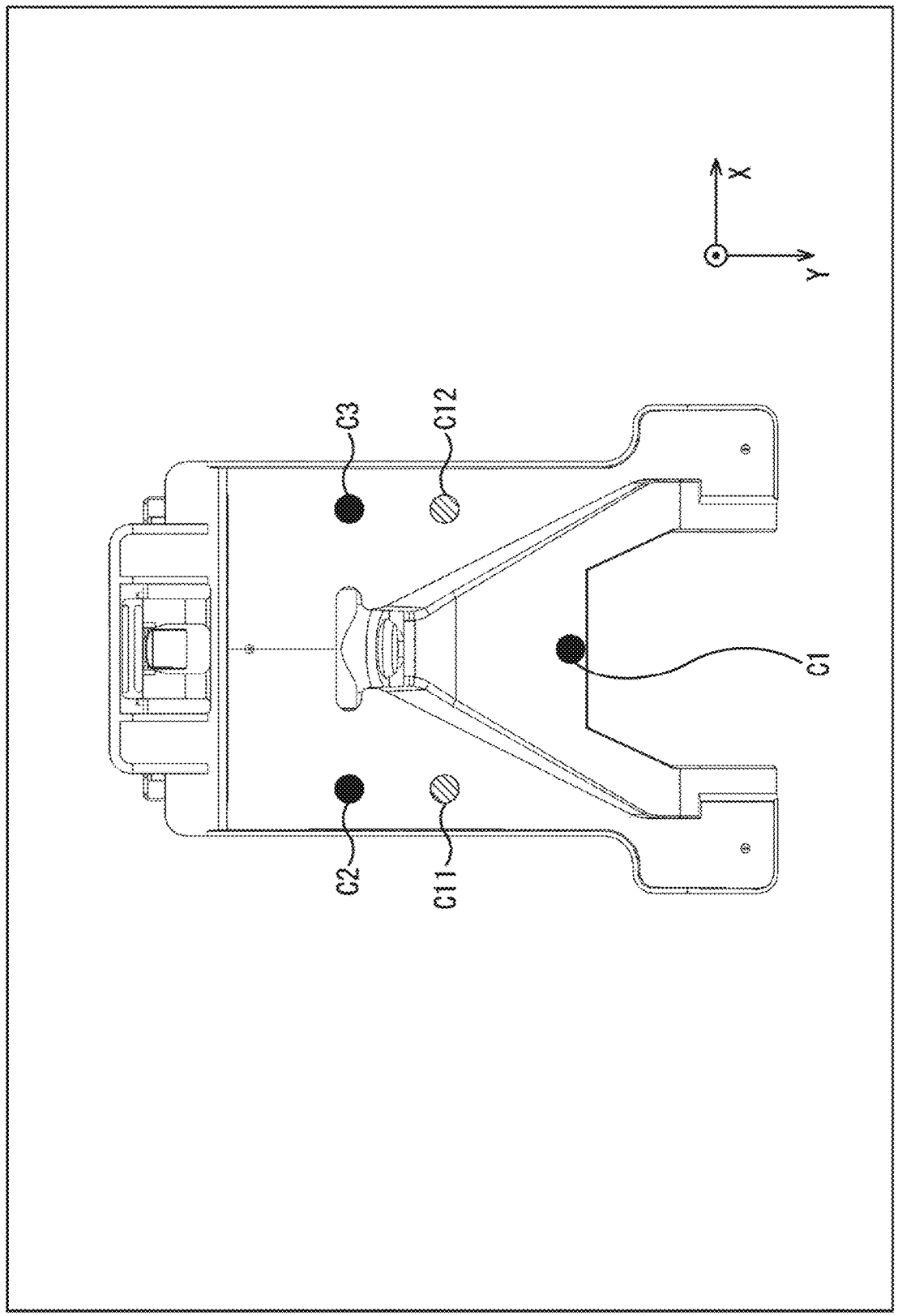
FIG. 29 is a plan view of positions where the forces are generated.

FIG. 29 is a plan view of the positions where the forces are generated.

As shown with black circles C1 to C3, by uniquely determining the three points at the forward center and on the left and right opposite sides, a position of the whole front camera 1 with respect to the bracket 2 is also uniquely determined. If the bracket 2 is mounted to the windshield G with precision, it means that the front camera 1 can be also positionally aligned with precision.

In FIG. 29, hatched circles C11, C12 represent the positions where the forces are applied from the flat springs 244L, 244R to the front camera 1.

The positions where the forces are applied from the flat springs 244L, 244R to the front camera 1 are located rearward of the position, as shown with the circle C1, of the tip end protruding portion 124 provided to the front face of the front camera 1 and located forward of the positions, as shown with the circles C2, C3, of the protruding portions 125-1L, 125-1R provided to the left and right opposite side faces of the front camera 1.

As described above, by using the holding mechanisms that press the cylindrical faces of the protruding portions against the V-shaped notch portions at the three contact portions at the forward center and on the left and right opposite sides, an assembler can positionally align the front camera 1 with precision. Furthermore, because it is necessary only to insert from the back face side of the bracket 2, the assembler can easily mount the front camera 1.

<Modifications>

Examples of Pressurizing Members

Although the metal flat springs are used as pressurizing members that apply the forces to the front camera 1, other members that generate resilient forces may be used.

Figure 30:
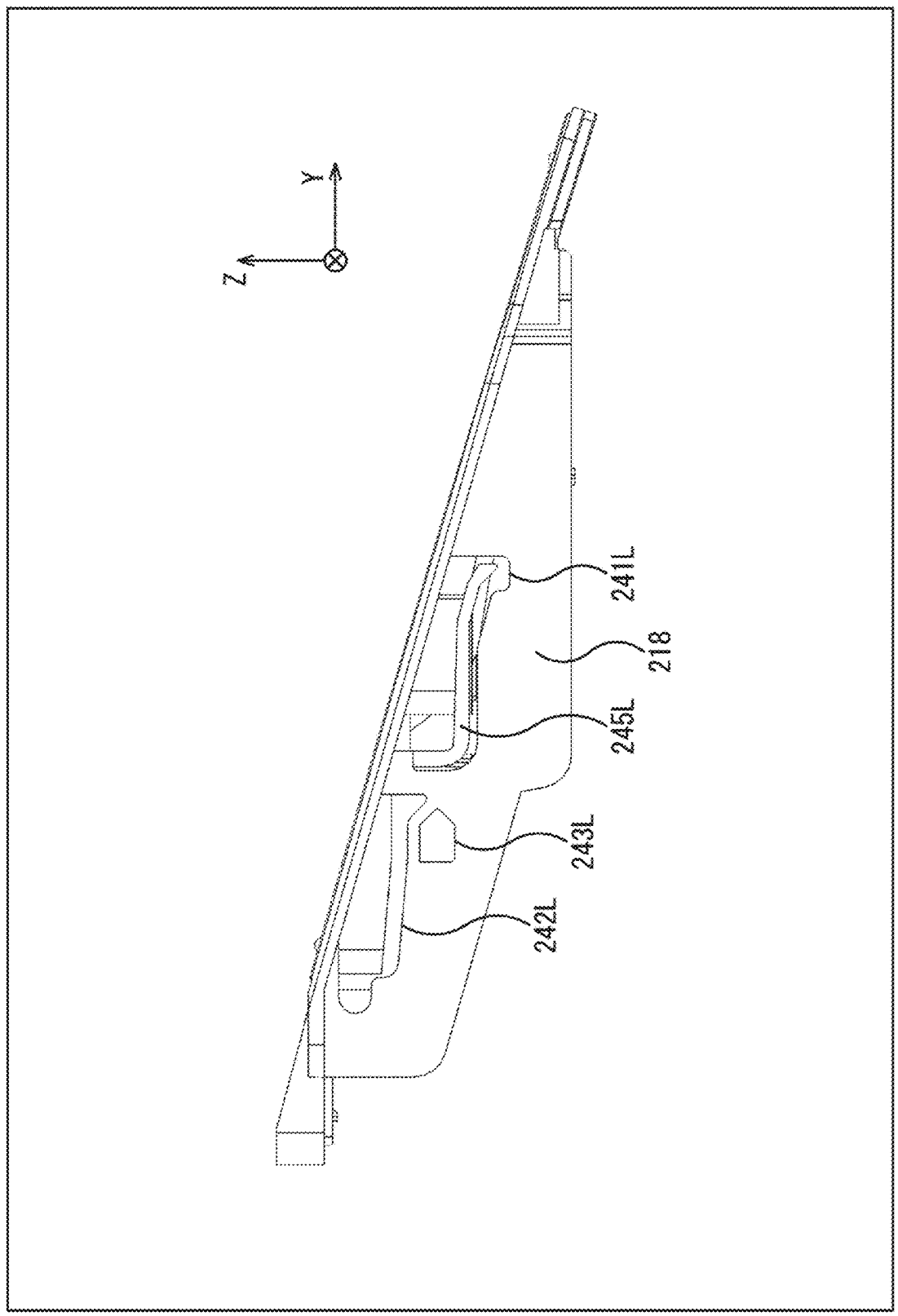
FIG. 30 is another left side view of the main portion.

FIG. 30 is another left side view of the main portion 2A.

In an example in FIG. 30, in place of the flat spring 244L, a pressurizing portion 245L molded as a forward-extended portion of the bottom face of the main portion 2A is used as a pressurizing member that generates a resilient force. The pressurizing portion 245L includes resin and is formed integrally with the main portion 2A.

The pressurizing portion 245L is a narrow member similarly to the flat spring 244L and is formed to gently slope down forward on a forward side. A tip end of the pressurizing portion 245L comes in contact with the slope of the notch portion 127L formed at the forward left end of the front camera 1 and applies a force for pressing forward and diagonally downward similarly to the pressing portion 244L-1 at the tip end of the flat spring 244L.

On the right side face side, similarly, a pressurizing member having a similar configuration to the pressurizing portion 245L is provided in place of the flat spring 244R. A tip end of the pressurizing portion provided on the right side face side comes in contact with the slope of the notch portion 127R formed at the forward right end of the front camera 1 and applies a force for pressing forward and diagonally downward.

In this manner, by using the other pressurizing members that generate the resilient forces, it is possible to uniquely determine the position of the front camera 1. Other pressurizing members such as spiral springs and rubber may be used.

Examples of Positions of Protruding Portions

Although the protruding portions having the cylindrical faces are provided to the front face and the left and right opposite side faces of the front camera 1, protruding portions may be provided at positions other than the side faces of the housing of the front camera 1 if the positions are bilaterally symmetric with respect to the position of the protruding portion on the front face. For example, the protruding portions may be provided to the top face portion 12A of the housing.

Furthermore, although the one protruding portion having the cylindrical face is provided to each of the front face and the left and right opposite side faces of the front camera 1, a plurality of the protruding portions may be formed on each of the faces. In this case, insertion holes are respectively formed at positions of the bracket 2 corresponding to positions of the protruding portions of the front camera 1. Substantially V-shaped notches that come in contact with the cylindrical faces are formed at the respective insertion holes.

Although the positions where the forces are applied from the flat springs to the front camera 1 are located forward of the positions of the protruding portions 125-1L, 125-1R provided to the left and right opposite side faces of the front camera 1, forces may be applied to the front camera 1 from positions rearward of the protruding portions 125-1L, 125-1R.

Examples of Material of Protruding Portions and Substantially V-Shaped Notch Portions The protruding portions having the cylindrical faces and the substantially V-shaped notch portions against which the protruding portions are pressed include resin and polyphenylene sulfide resin (PPS), for example, can be used as the resin used for the protruding portions and the notch portions.

Alternatively, different materials, e.g., metal (aluminum/stainless steel) for the protruding portions and the resin (PPS) for the notch portions, may be used.

For example, the resin (PPS) can be used for the protruding portions and the resins (polycarbonate (PC) and acrylonitrile-butadiene-styrene copolymer synthetic resin (ABS)) can be used for the notch portions. The resin (PPS) can be used for the protruding portions and the metal (stainless steel) can be used for the notch portions.

Figure 31:
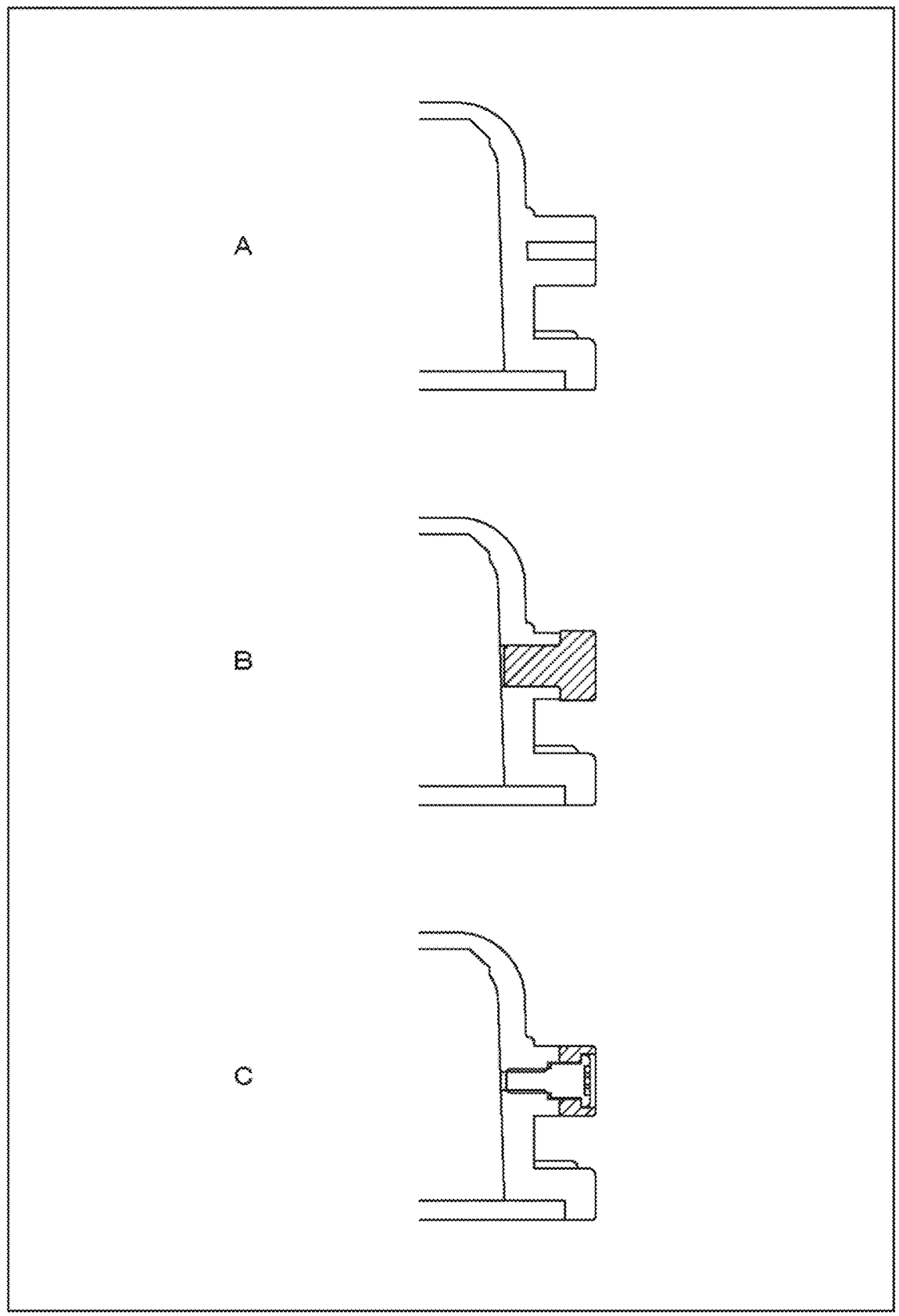
FIG. 31 contains sectional views of states of protruding portions including the ones mounted with parts including different materials.

In a case where the different materials are used as materials of each of the protruding portions and each of the substantially V-shaped notch portions, a part including the different material and forming a portion of the protruding portion is mounted to the front case 12 by being inserted into a hole portion formed in the protruding portion as shown in B of FIG. 31. In FIG. 31, hatched parts are the parts including different materials from the materials of the protruding portions formed integrally with the front case 12. Note that A of FIG. 31 shows the protruding portion entirely including resin.

As shown in C of FIG. 31, a part including the different material and forming a portion of each of the protruding portions may be screwed to the front case 12. An enlarged view of a state of the protruding portion 125R where the part including the different material is screwed is shown in B of FIG. 32.

In a case where the metal (stainless steel) is used for each of the notch portions, a thin plate of the metal (stainless steel) may be stuck to the notch portion.

Although the holding mechanisms for the onboard camera have been described, the above-described holding mechanisms can be used as mechanisms used in a case where an electronic device other than the onboard camera is mounted.

Note that effects described herein are merely examples and not sole effects and other effects may be exerted.

Examples of Combination of Configurations

The present technology may have the following configurations.

(1)

A holding method of holding an onboard camera that includes protruding portions having cylindrical faces respectively formed on a front face and left and right opposite side faces of a housing,
by pressing the cylindrical faces of the respective protruding portions of the onboard camera against notches at insertion holes formed at positions of a bracket corresponding to positions of the respective protruding portions by use of forces applied by pressurizing members provided to the bracket, the pressurizing members applying the forces to predetermined positions of the housing.

(2)

The holding method according to the item (1),
in which one of the protruding portions of the onboard camera is formed on each of the front face and the left and right opposite side faces of the housing.

(3)

The holding method according to the item (1) or (2),
in which the positions to which the pressurizing members apply the forces are located rearward of the protruding portion provided on the front face of the housing and located forward of the protruding portions provided on the left and right opposite side faces of the housing.

(4)

The holding method according to any one of the items (1) to (3),
in which the notches at the insertion holes formed in the bracket include V-shaped notches.

(5)

The holding method according to the item (4),
in which the notch is formed to face downward at the insertion hole into which the protruding portion on the front face of the housing is inserted and
the notches are formed to face forward at the insertion holes into which the protruding portions on the left and right opposite side faces of the housing are inserted.

(6)

The holding method according to the item (5),
in which the pressurizing members include
a first pressurizing member that applies a force including a forward component of force to a left end of the housing and
a second pressurizing member that applies a force including a forward component of force to a right end of the housing.

(7)

An onboard camera including
protruding portions having cylindrical faces respectively formed on a front face and left and right opposite side faces of a housing and
notch portions on the housing and formed at such positions that pressurizing members of a bracket come in contact with the notch portions, the bracket having insertion holes for the protruding portions at positions corresponding to positions of the protruding portions.

(8)

The onboard camera according to the item (7),
in which the one protruding portion is formed on each of the front face and the left and right opposite side faces of the housing.

(9)

The onboard camera according to the item (8)
in which the protruding portion formed on the front face of the housing has at least the cylindrical face facing downward and
the protruding portions formed on the left and right opposite side faces of the housing have at least the cylindrical faces facing forward.

(10)

The onboard camera according to any one of the items (7) to (9),
in which the notch portions are formed at positions rearward of the protruding portion provided on the front face of the housing and forward of the protruding portions provided on the left and right opposite side faces of the housing.

(11)

The onboard camera according to the item (10),
in which the notch portions are respectively formed at a left end and a right end of the housing.

(12)

A bracket including
insertion holes for protruding portions respectively formed on a front face and left and right opposite side faces of a housing of an onboard camera, the insertion holes formed at positions corresponding to positions of the protruding portions and
pressurizing members that press cylindrical faces of the respective protruding portions of the onboard camera against notches formed at the respective insertion holes by applying forces to predetermined positions of the housing.

(13)

The bracket according to the item (12),
in which the positions on the housing to which the pressurizing members apply the forces are located rearward of the insertion hole into which the protruding portion provided on the front face of the housing is inserted and located forward of the insertion holes into which the protruding portions provided on the left and right opposite side faces of the housing are inserted.

(14)

The bracket according to the item (12) or (13),
in which the notches at the insertion holes include V-shaped notches.

(15)

The bracket according to the item (14),
in which the notch is formed to face downward at the insertion hole into which the protruding portion on the front face of the housing is inserted and
the notches are formed to face forward at the insertion holes into which the protruding portions on the left and right opposite side faces of the housing are inserted.

(16)

The bracket according to the item (15),
in which the pressurizing members include
the first pressurizing member that applies the force including a forward component of force to a left end of the housing and
the second pressurizing member that applies the force including a forward component of force to a right end of the housing.

(17)

The bracket according to any one of the items (12) to (16),
in which the pressurizing members are formed by curving narrow metal plates.

REFERENCE SIGNS LIST

1 Front camera
2 Bracket
2A Main portion
2B Sub portion
21 Lens
124 Tip end protruding portion
125L, 125R Protruding portion
127R, 127L Notch portion
211 Top face portion
216 Insertion portion
218L Left side face portion
218R Right side face portion
243L, 243R Small hole portion
244L, 244R Flat spring

The invention claimed is:

1. A holding method of holding an onboard camera that includes protruding portions having cylindrical faces respectively formed on a front face and left and right opposite side faces of a housing,
by pressing the cylindrical faces of the respective protruding portions of the onboard camera against V-shaped notches at insertion holes formed at positions of a bracket corresponding to positions of the respective protruding portions by use of forces applied by pressurizing members provided to the bracket, the pressurizing members applying the forces to predetermined positions of the housing.

2. The holding method according to claim 1,
wherein one of the protruding portions of the onboard camera is formed on each of the front face and the left and right opposite side faces of the housing.

3. The holding method according to claim 1,
wherein the positions to which the pressurizing members apply the forces are located rearward of the protruding portion provided on the front face of the housing and located forward of the protruding portions provided on the left and right opposite side faces of the housing.

4. The holding method according to claim 1,
wherein the notches at the insertion holes formed in the bracket include V-shaped notches.

5. The holding method according to claim 4,
wherein the notch is formed to face downward at the insertion hole into which the protruding portion on the front face of the housing is inserted and
the notches are formed to face forward at the insertion holes into which the protruding portions on the left and right opposite side faces of the housing are inserted.

6. The holding method according to claim 5,
wherein the pressurizing members include
a first pressurizing member that applies a force including a forward component of force to a left end of the housing and
a second pressurizing member that applies a force including a forward component of force to a right end of the housing.

7. An onboard camera comprising
protruding portions having cylindrical faces respectively formed on a front face and left and right opposite side faces of a housing and
notch portions on the housing and formed at such positions that pressurizing members of a bracket come in contact with the notch portions, the bracket having pentagonal-shaped insertion holes for the protruding portions at positions corresponding to positions of the protruding portions.

8. The onboard camera according to claim 7,
wherein the one protruding portion is formed on each of the front face and the left and right opposite side faces of the housing.

9. The onboard camera according to claim 8
wherein the protruding portion formed on the front face of the housing has at least the cylindrical face facing downward and
the protruding portions formed on the left and right opposite side faces of the housing have at least the cylindrical faces facing forward.

10. The onboard camera according to claim 7,
wherein the notch portions are formed at positions rearward of the protruding portion provided on the front face of the housing and forward of the protruding portions provided on the left and right opposite side faces of the housing.

11. The onboard camera according to claim 10,
wherein the notch portions are respectively formed at a left end and a right end of the housing.

12. A bracket comprising
insertion holes for protruding portions respectively formed on a front face and left and right opposite side faces of a housing of an onboard camera, the insertion holes formed at positions corresponding to positions of the protruding portions and
pressurizing members that press cylindrical faces of the respective protruding portions of the onboard camera against V-shaped notches formed at the respective insertion holes by applying forces to predetermined positions of the housing.

13. The bracket according to claim 12,
wherein the positions on the housing to which the pressurizing members apply the forces are located rearward of the insertion hole into which the protruding portion provided on the front face of the housing is inserted and located forward of the insertion holes into which the protruding portions provided on the left and right opposite side faces of the housing are inserted.

14. The bracket according to claim 12,
wherein the notches at the insertion holes include V-shaped notches.

15. The bracket according to claim 14,
wherein the notch is formed to face downward at the insertion hole into which the protruding portion on the front face of the housing is inserted and
the notches are formed to face forward at the insertion holes into which the protruding portions on the left and right opposite side faces of the housing are inserted.

16. The bracket according to claim 15,
wherein the pressurizing members include
the first pressurizing member that applies the force including a forward component of force to a left end of the housing and
the second pressurizing member that applies the force including a forward component of force to a right end of the housing.

17. The bracket according to claim 12,
wherein the pressurizing members are formed by curving narrow metal plates.

* * * * *